US010607124B2

(12) United States Patent
Kouguchi

(10) Patent No.: US 10,607,124 B2
(45) Date of Patent: Mar. 31, 2020

(54) LABEL-PRINTING CONTROL APPARATUS, NON-TRANSITORY COMPUTER-READABLE RECORDING MEDIUM AND LABEL-PRINTING CONTROL METHOD

(71) Applicant: KONICA MINOLTA, INC., Chiyoda-ku, Tokyo (JP)

(72) Inventor: Masatsugu Kouguchi, Hachioji (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/371,631

(22) Filed: Apr. 1, 2019

(65) Prior Publication Data

US 2019/0311233 A1    Oct. 10, 2019

(30) Foreign Application Priority Data

Apr. 4, 2018 (JP) ................. 2018-071996

(51) Int. Cl.
  *G06K 15/02* (2006.01)
  *B41J 3/407* (2006.01)
  *B65C 9/18* (2006.01)
  *G06K 15/00* (2006.01)

(52) U.S. Cl.
  CPC .......... *G06K 15/024* (2013.01); *B41J 3/4075* (2013.01); *B65C 9/1803* (2013.01); *G06K 15/027* (2013.01); *G06K 15/1868* (2013.01); *G06K 15/403* (2013.01)

(58) Field of Classification Search
  CPC .............. G06K 15/024; G06K 15/027; G06K 15/1868; G06K 15/403; B41J 3/4075; B65C 9/1803; H04N 1/00103; H04N 1/00413; H04N 1/00411

USPC ................................................ 358/1.18, 1.15
See application file for complete search history.

(56) References Cited

U.S. PATENT DOCUMENTS

| | | | | |
|---|---|---|---|---|
| 2009/0167013 A1* | 7/2009 | Horikoshi | ................. | B41J 2/36 283/81 |
| 2017/0344861 A1* | 11/2017 | Shirasaka | ................. | B41J 5/32 |
| 2018/0250974 A1* | 9/2018 | Sato | ...................... | B41J 3/4075 |

FOREIGN PATENT DOCUMENTS

| | | |
|---|---|---|
| JP | 2016087902 A | 5/2016 |
| JP | 2017062536 A | 3/2017 |

\* cited by examiner

*Primary Examiner* — Allen H Nguyen
(74) *Attorney, Agent, or Firm* — Buchanan Ingersoll & Rooney PC

(57) ABSTRACT

Provided are a label-printing control apparatus, a non-transitory computer-readable recording medium and a label-printing control method. A hardware processor of the label-printing control apparatus creates an adjusting image, from a reference mark for determining a die-cutting position on a continuous label stock and a cut mark representing a shape to cut a label image printed on the continuous label stock, both extracted from print data, while arranging specific images each created from the cut mark, to be spaced apart from the respective reference marks with different distances in the adjusting image. The hardware processor further creates, from the reference mark and a label image extracted from the print data, an end product image including the reference mark and the label image, and instructs the label printing device to print the adjusting image and the end product image on a continuous label stock.

23 Claims, 15 Drawing Sheets

LABEL-PRINTING CONTROL APPARATUS, NON-TRANSITORY COMPUTER-READABLE RECORDING MEDIUM AND LABEL-PRINTING CONTROL METHOD

Japanese Patent Application No. 2018-071996 filed on Apr. 4, 2018, including description, claims, drawings, and abstract, the entire disclosure of which is incorporated herein by reference in its entirety.

TECHNOLOGICAL FIELD

The present invention is directed to label-printing control apparatuses, non-transitory computer-readable recording media each storing a label-printing control program and label-printing control methods. In particular, the present invention is directed to label-printing control apparatuses which realize easy adjustment of die-cutting positions in label production, non-transitory computer-readable recording media each storing a label-printing control program to be executed in the label-printing control apparatus, and label-printing control methods for use in a printing system including the label-printing control apparatus.

BACKGROUND

In production of a roll of labels (pressure-sensitive labels), just printing label images by a label printing device on a face of label material provided in roll form (a roll or continuous label stock), is not enough to obtain an end product. To provide an end product, the label printing device cooperates with a finisher, to cause the finisher to perform a process to cut label images printed on the face of a continuous label stock into label shapes with a cutting tool or die (referred to as die-cutting) and a process to remove waste or waste face material surrounding the labels from the continuous label stock (referred to as removing waste). In order to allow a finisher to perform appropriate processing on a continuous label stock in the above processes, a label printing device prints reference marks, so-called "eye marks", which are marks to tell the finisher where to cut a face of the continuous label stock, together with label images on the face of the continuous label stock. The finisher then die-cuts the label images printed on the continuous label stock into label shapes, while sensing the reference marks.

As an example of a technique of label printing, Japanese Unexamined Patent Publication (JP-A) No. 2017-062536 discloses a label-printing control apparatus which instructs a label printing device to print label images on label material on which the label images are to be cut into label shapes by a die-culling machine. The label-printing control apparatus comprises the following built-in controller. The built-in controller performs print-data analysis by obtaining print data including one or more label images and corresponding one or more cut marks each indicating a contour to cut the corresponding label image printed on label material, and by extracting the one or more cut marks from the print data. The built-in controller then creates an end product image by removing the one or more cut marks from the print data. The built-in controller finds an apex of each cut mark, and creates an adjusting image including a plurality of the cut marks with graduations added adjacent to the apex of each cut mark. The built-in controller then outputs image data of the end product image and the adjusting image to the label printing device and instructs the label printing device to print the end product image and the adjusting image successively on label material.

As another example of a technique of label printing, JP-A No. 2016-087902 discloses a method for adjusting cutting positions to printing positions in label printing. The method comprises a process of using an ink-jet head that discharges an ink on a medium for printing, to print an origin-point adjusting image having a plurality of checking blocks on the medium. The method further comprises a process of culling the medium with a cutting head along the contour of the origin-point adjusting image. The method further comprises a process of removing a part of the medium cut by the cutting head from the medium; and a process of inputting the amount of displacement between the printing position of the ink-jet head on the medium and the cutting position of the cutting head on the medium to a controller that controls the inkjet head and the cutting head, so as to be used for a value of correction between the printing position of the ink-jet head and the cutting position of the cutting head. The method further comprises a check process to be performed, while printing on the medium the origin-point adjusting image or cutting the medium. The check process is performed by displacing the position of printing with the ink-jet head or the position of cutting with the cutting head, by a certain shift amount at each of the plurality of checking blocks, in the main-scanning direction or the sub-scanning direction of the ink-jet head.

By using reference marks printed on a face of a label stock, a finisher can determine cutting positions on the label stock. Since finishers are configured to perform cutting with a cutting tool (die), which is mounted to the finisher so as to cut out a label shape, the mounted die can be misaligned and be out of its proper position. In view of that, in a general die-cutting process, after a finisher cuts a predetermined number of label images printed on a label stock into label shapes with the die, an operator checks the label images cut with the die visually and adjusts the die-cutting positions. This position adjustment is repeated until the die becomes to cut printed label images at desired positions on the label stock. It needs the label printing device to print more than a number of label images ordered by a customer. It further needs an unskilled operator to perform the position adjustment repeatedly until the operator gets skilled at the position adjustment, because the accuracy of the position adjustment depends on the operator's skill. It can result in a problem that it is necessary for the label printing device to print a large number of label images which will be wasted for the position adjustment, and resources and man-hours are wastefully used for the position adjustment.

In view of that. JP-A No. 2017-062536 discloses a technique to use graduations (a scale) printed adjacent to an apex of each cut mark, to allow an operator to recognize the amount of displacement of die-cutting positions from printing positions. In this technique, scales are spaced apart from respective reference marks with fixed spaces on the face of a label stock. It results in that the same part of the scale remains on every label given after die-cutting of the label stock. Therefore, an operator hardly recognizes the amount of displacement of the die-cutting positions from the printing positions intuitively from graduations of the scale remaining on each label. IP-A No. 2016-087902 discloses a technique to use an origin-point adjusting image having a plurality of checking blocks, to perform printing the origin-point adjusting image or cutting the contour of the origin-point adjusting image printed on a label stock, while displacing the printing position or the cutting position by a certain shift amount at each of the checking blocks. In this technique, the positional relationship between the printing position of the contour of each checking block and the corresponding cutting position is merely changed gradually along the origin-point adjusting image. With this technique, an operator hardly recognizes the accurate amount of displacement of the cutting positions from the printing positions.

SUMMARY

The present invention is directed to label-printing control apparatuses, non-transitory computer-readable recording media each storing a label-printing control program, and label-printing control methods, which allows an operator to intuitively recognize the accurate displacement amount of die-cutting positions.

A label-printing control apparatus reflecting one aspect of the present invention is a label-printing control apparatus for controlling a label printing device. The label printing device is configured to print label images, which are to be cut into label shapes by die-cutting, on a continuous label stock. The label-printing control apparatus comprises an engine interface unit that communicably connects the label-printing control apparatus to the label printing device; and a hardware processor that performs the following operations. The operations include analyzing, print data to extract a label image, a reference mark and a cut mark from the print data, where the reference mark is a mark used for determining a die-cutting position on a continuous label stock, and the cut mark represents a shape to cut the label image printed on the continuous label stock. The operations further include creating, from the reference mark and the cut mark extracted from the print data, an adjusting image including a plurality of the reference marks and one or more specific images each created from the cut mark, corresponding to each of the plurality of the reference marks, while arranging the specific images to be spaced apart from the respective reference marks with different distances in the adjusting image. The operations further include outputting data of the adjusting image to the label printing device through the engine interface unit, to instruct the label printing device to print the adjusting image on a continuous label stock. The operations further include creating, from the reference mark and the label image extracted from the print data, an end product image including the reference mark and the label image corresponding to the reference mark; and outputting data of the end product image to the label printing device through the engine interface unit, to instruct the label printing device to print the end product image on the continuous label stock.

A non-transitory computer-readable recording medium reflecting one aspect of the present invention stores a label-printing control program to be executed in a controller of a label printing device. The label printing device is configured to print label images, which are to be cut into label shapes by die-cutting, on a continuous label stock. The program comprises instructions which, when executed by a hardware processor of the controller, cause the hardware processor to perform the following operations. The operations comprise analyzing print data to extract a label image, a reference mark and a cut mark from the print data, where the reference mark is a mark used for determining a die-cutting position on a continuous label stock, and the cut mark represents a shape to cut the label image printed on the continuous label stock. The operations further comprise creating, from the reference mark and the cut mark extracted from the print data, an adjusting image including a plurality of the reference marks and one or more specific images each created from the cut mark, corresponding to each of the plurality of the reference marks, while arranging the specific images to be spaced apart from the respective reference marks with different distances in the adjusting image. The operations further comprise outputting data of the adjusting image to the label printing device through an engine interface unit of the controller, to instruct the label printing device to print the adjusting image on a continuous label stock. The operations further comprise creating, from the reference mark and the label image extracted from the print data, an end product image including the reference mark and the label image corresponding to the reference mark; and outputting data of the end product image to the label printing device through the engine interlace unit, to instruct the label printing device to print the end product image on the continuous label stock.

A label-printing control method reflecting one aspect of the present invention is a label-printing control method for use in a printing system including a label printing device. The label printing device is configured to print label images, which are to be cut into label shapes by die-cutting, on a continuous label stock. The method comprises analyzing, by a controller of the label printing device, print data to extract a label image, a reference mark and a cut mark from the print data, where the reference mark is a mark used for determining a die-cutting position on a continuous label stock, and the cut mark represents a shape to cut the label image printed on the continuous label stock. The method further comprises creating, by the controller, from the reference mark and the cut mark extracted from the print data, an adjusting image including a plurality of the reference marks and one or more specific images each created from the cut mark, corresponding to each of the plurality of the reference marks, while arranging the specific images to be spaced apart from the respective reference marks with different distances in the adjusting image. The method further comprises printing the adjusting image on a continuous label stock by the label printing device. The method further comprises creating, by the controller, from the reference mark and the label image extracted from the print data, an end product image including the reference mark and the label image corresponding to the reference mark; and priming the end product image on the continuous label stock by the label printing device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein.

DETAILED DESCRIPTION OF EMBODIMENTS

Figure 1A:
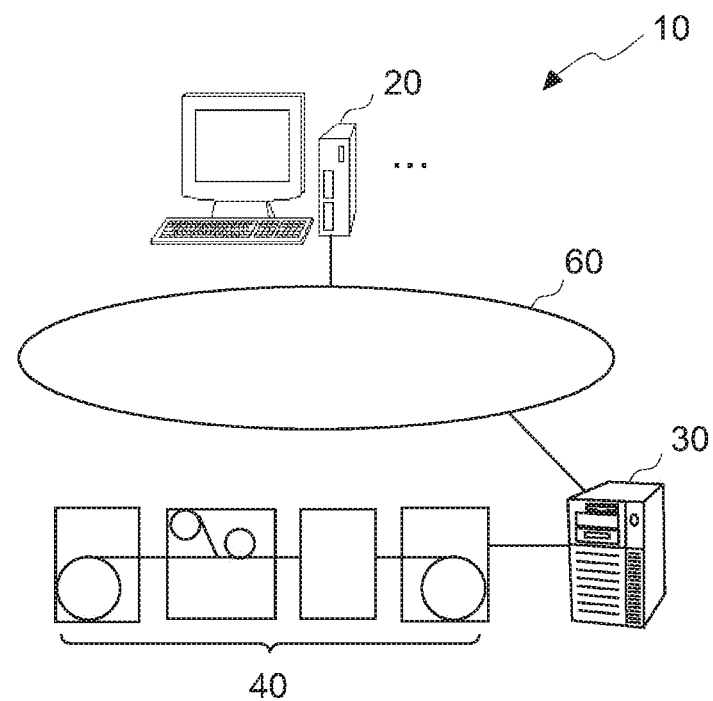
FIGS. 1A and 1B are schematic diagrams illustrating examples of the constitution of a printing system according to one embodiment of the present invention.

Hereinafter, one or more embodiments of the present invention will be described with reference to the drawings. However, the scope of the invention is not limited to the illustrated embodiments.

As described in the section of BACKGROUND, in a process of die-cutting of label images printed on a label stock into label shapes with a finisher, in consideration of an occurrence of misalignment of a cutting tool (die) of the finisher, an operator repeatedly performs the adjustment of die-cutting positions by cutting a predetermined number of printed label images into label shapes, until the finisher becomes to cut printed label images at desired positions on the label stock. This position adjustment needs an operator's skill and needs a label printing device to print a large number of label images, which will be used for the position adjustment and then disposed. It arises a problem of a wasteful use of resources and man-hours for label production.

In view of that, JP-A No. 2017-062536 discloses a technique to use graduations (a scale) printed adjacent to an apex of each cut mark, to allow an operator to recognize the amount of displacement of die-cutting positions from printing positions. In this technique, scales are spaced apart from respective reference marks with fixed spaces on the face of a label stock. It results in that the same part of the scale remains on every label given after die-cutting of the label stock. Therefore, an operator hardly recognizes the amount of displacement of the die-cutting positions from the printing positions intuitively from graduations of the scale remaining on each label. JP-A No. 2016-087902 discloses a technique to use an origin-point adjusting image having a plurality of checking blocks, to perform printing the origin-point adjusting image or cutting the contour of the origin-point adjusting image printed on a label stock, while displacing the printing position or the cutting position by a certain shift amount at each of the checking blocks. In this technique, the positional relationship between the printing position of the contour of each checking block and the corresponding cutting position is merely changed gradually along the origin-point adjusting image. With this technique, an operator hardly recognizes the accurate amount of displacement of the cutting positions from the printing positions.

In view of that, the following label-printing control apparatus is provided as an embodiment of the present invention. The label-printing control apparatus is an apparatus for controlling a label printing device configured to print label images, which are to be cut into label shapes by die-cutting, on a continuous label stock. The hardware processor of the label-printing control apparatus is configured to perform the following operations. In response to receiving print data that instructs to print label images, the hardware processor analyzes the print data to extract a label image, a reference mark (eye mark) and a cut mark from the print data, where the reference mark is a mark used for determining a die-cutting position on a continuous label stock, and the cut mark represents a shape or contour to cut the label image printed on the continuous label stock. The hardware processor then creates an end product image and an adjusting image, where the end product image includes the reference mark and the label image corresponding to the reference mark, and the adjusting image includes a plurality of the reference marks and one or more specific images corresponding to each of the plurality of the reference marks. Each of the specific images in the adjusting image is created from the cut mark, and examples of the specific images include figures each created from the cut mark, such as cut marks themselves, rectangles each circumscribed about the cut mark, and scales each including graduations covering the area of the cut mark. The hardware processor then outputs data of the end product image and data of the adjusting image to the label printing device through an engine in unit of the label-printing control apparatus, to instruct the label printing device to print the adjusting image and the end product image on a continuous label stock. In the process of creating the adjusting image, the hardware processor arranges the specific images to be spaced apart from the respective reference marks with different distances. In concrete terms, the hardware processor arranges the specific images to be spaced apart from the respective reference marks with different distances, by spacing the specific images apart from the respective reference marks in the machine direction of the continuous label stock, or in both the machine direction and the cross-machine direction of the continuous label stock. The distances of the specific images from the respective reference marks may change (increase or decrease) at fixed intervals or at intervals changing in a stepwise manner. The hardware processor may add values indicating the distances of the specific images from the respective reference marks in one or both of the machine direction and the cross-machine direction, to the adjusting image.

Additionally to the operations of the label-printing control apparatus, the adjusting image printed on the continuous label stock given after die-cutting of the continuous label stock may be checked, to obtain the displacement amount of a die-cutting position on the continuous label stock, and then, the die-cutting position on the continuous label stock or a printing position of the end product image on the continuous label stock may be adjusted by using the displacement amount. Further, an additional image may be printed on a continuous label stock on which an image and the reference mark were printed, while determining the printing position of the additional image on the basis of the reference mark.

As described above, the label-printing control apparatus according to an embodiment of the present invention uses specific images each created from a cut mark, such as cut marks, rectangles each circumscribed about the cut mark, or scales each including graduations covering an area of the cut mark, in the adjusting image, and arranges the specific images to be spaced apart from the respective reference marks with different distances in a certain direction. It allows an operator to intuitively recognize the accurate displacement amount of die-cutting positions from printing positions on a label stock. It realizes easy adjustment of the die-cutting positions on a label stock and/or easy adjustment of the printing position of an end product image, which reduces the number of times of the adjustment of cutting positions to printing positions, necessary to die-cut a label stock at desired positions, and reduces a wasteful use of resources and man-hours for label printing.

The technique disclosed in JP-A No. 2016-087902 uses a fixed adjusting pattern that was prepared in advance and this technique is suitable only in cases that printing and cutting are performed as in-line processes. On the other hand, the label-printing control apparatus according to an embodiment of the present invention, uses an adjusting pattern (specific images, like cut marks, rectangles or scales in the adjusting image) created from a cut mark. Therefore, the operations of the label-printing control apparatus are applicable to both a printing system including an apparatus that serves a label printing device and a finisher and a printing system employing a label printing device and a finisher as separated devises. Further, in a printing system including a label printing device and a finisher as separated devises, an unexpected amount of displacement of cutting positions may arise and an operator may hardly recognize the amount with the techniques disclosed in JP-A Nos. 2017-062536 and 2016-087902. However, in the operations according to an embodiment of the present invention, the specific images each crated from a cut mark are printed with being spaced apart from each reference mark while changing the distance of each of the specific images from the corresponding reference mark, which allows adjustment of an unexpected amount of displacement of cutting positions appropriately.

Embodiments

Figure 1B:
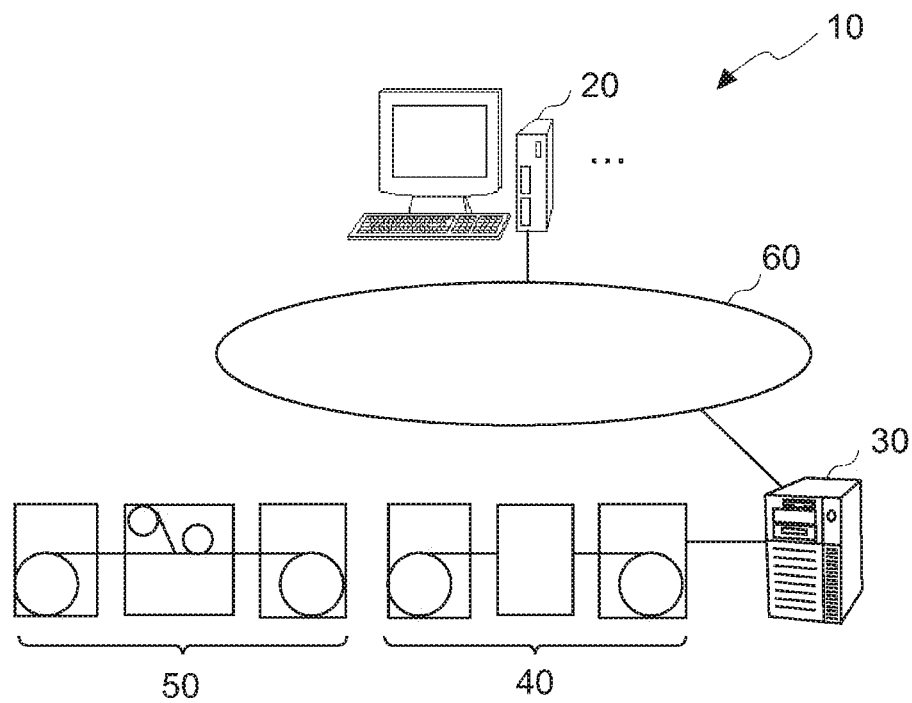
Figure 6:
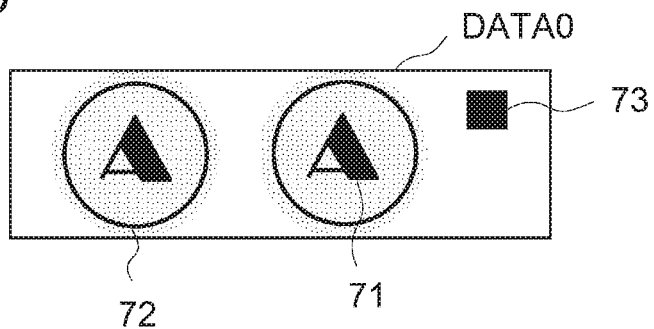
FIG. 6 is a diagram illustrating print data.
Figure 7:
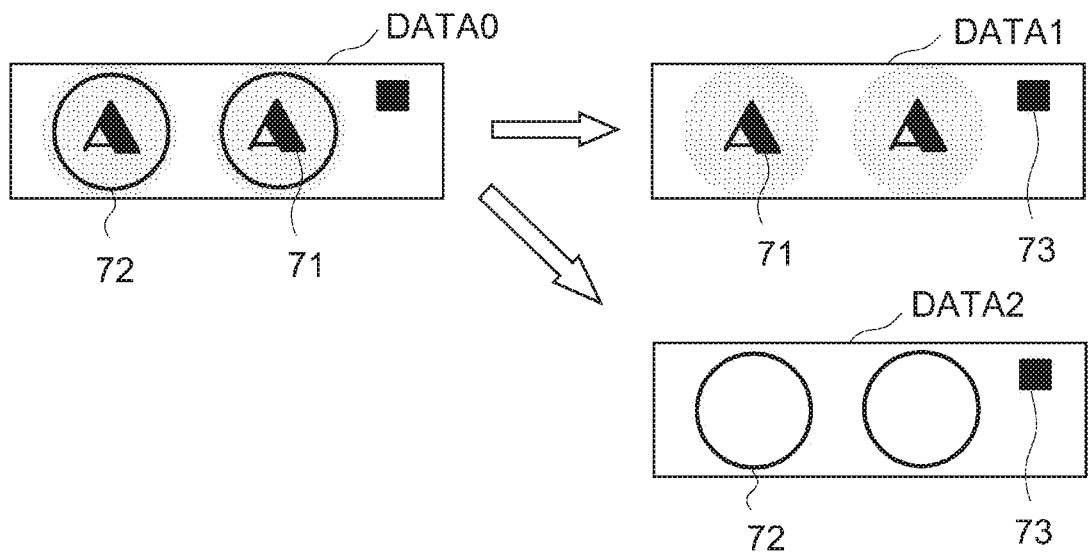
FIG. 7 is a diagram illustrating data created from the print data.
Figure 8:
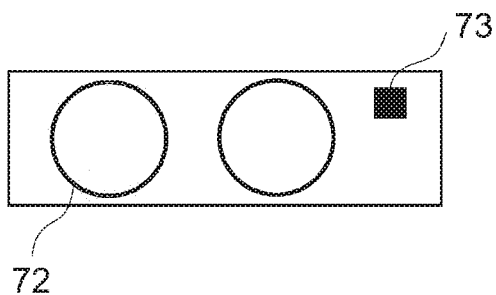
FIG. 8 is a diagram for illustrating a process to create data of an adjusting image.
Figure 9:
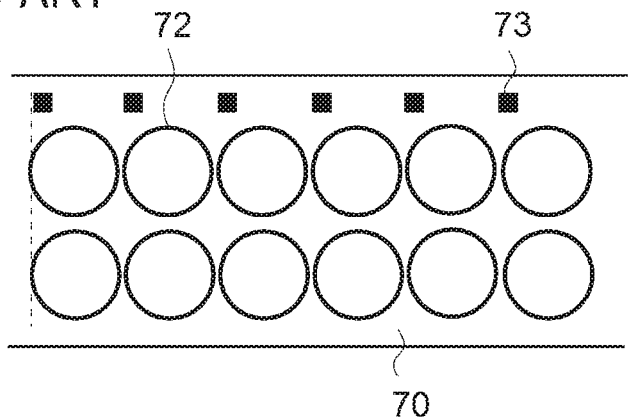
FIG. 9 is a diagram illustrating an example of a continuous label stock on which pairs of cut marks were printed with being spaced apart from respective reference marks with fixed spaces.
Figure 10A:
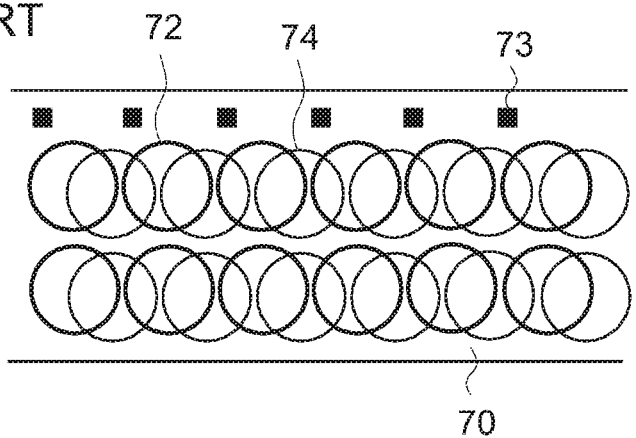
FIGS. 10A and 10B are diagrams illustrating the continuous label stock of FIG. 9 after a process of die-cutting without performing adjustment of die-cutting positions, and after a process of removing waste from the continuous label stock, respectively.
Figure 10B:
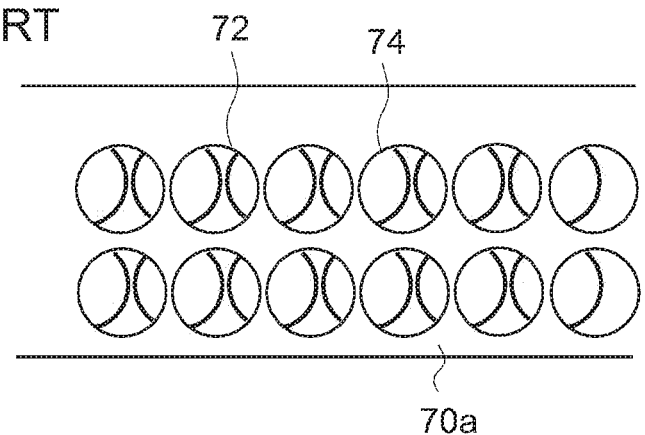
Figure 16:
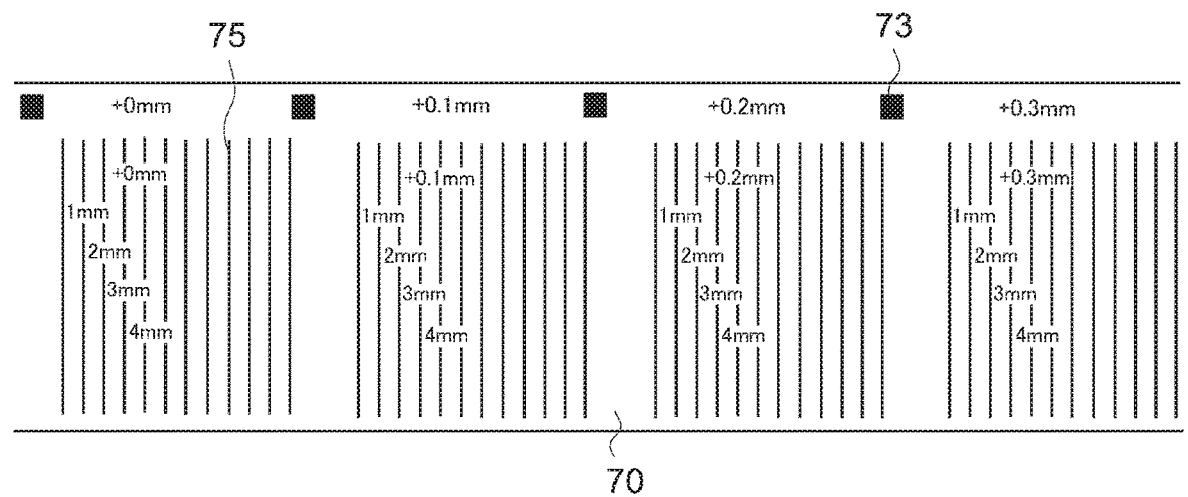
FIG. 16 is a diagram illustrating an example of a continuous label stock on which scales were printed with being spaced apart from respective reference marks.
Figure 17:
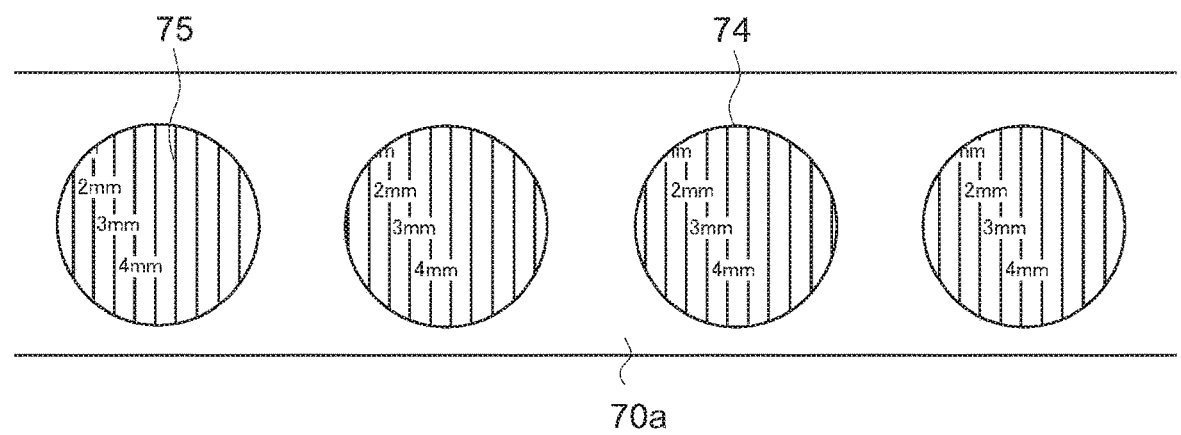
FIG. 17 is a diagram illustrating the continuous label stock of FIG. 16 after a process of removing waste from the continuous label stock.
Figure 18:
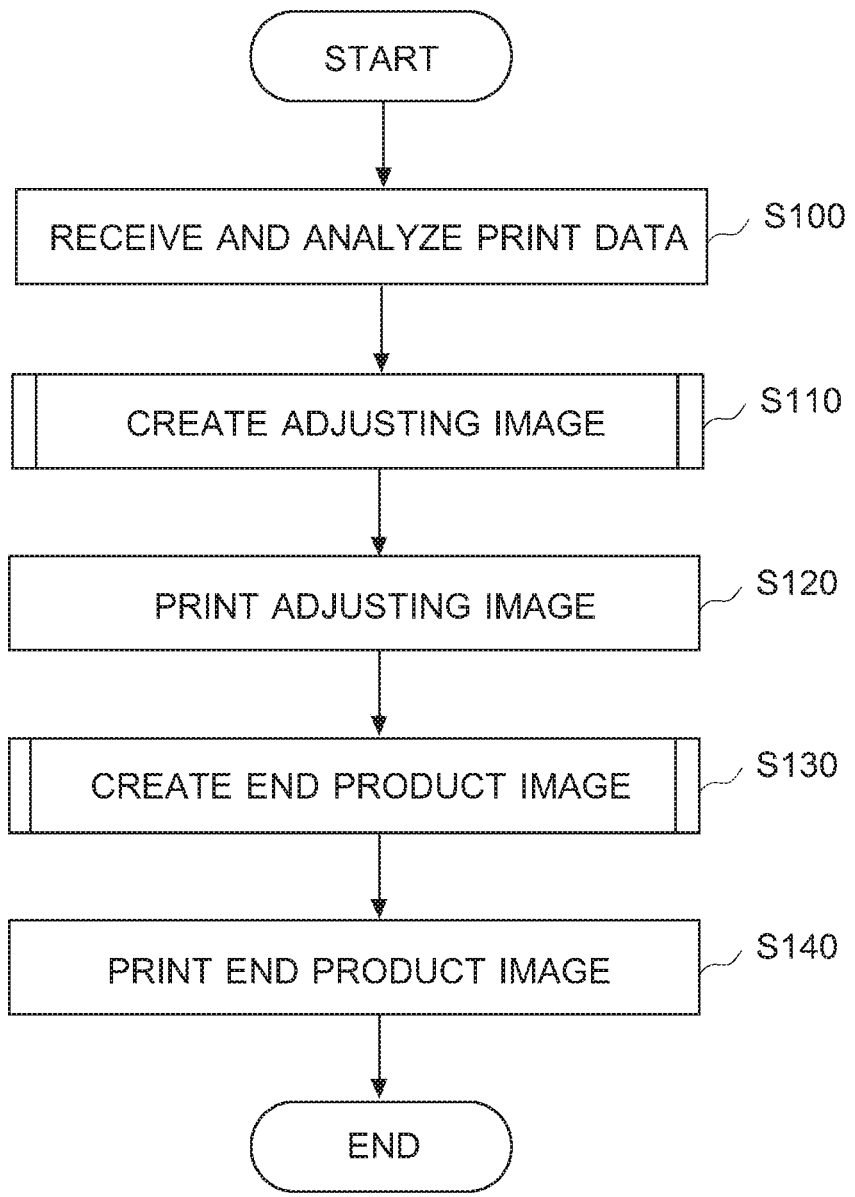
FIG. 18 is a flowchart illustrating an example of operations of the printer controller according to one embodiment of the present invention.
Figure 19:
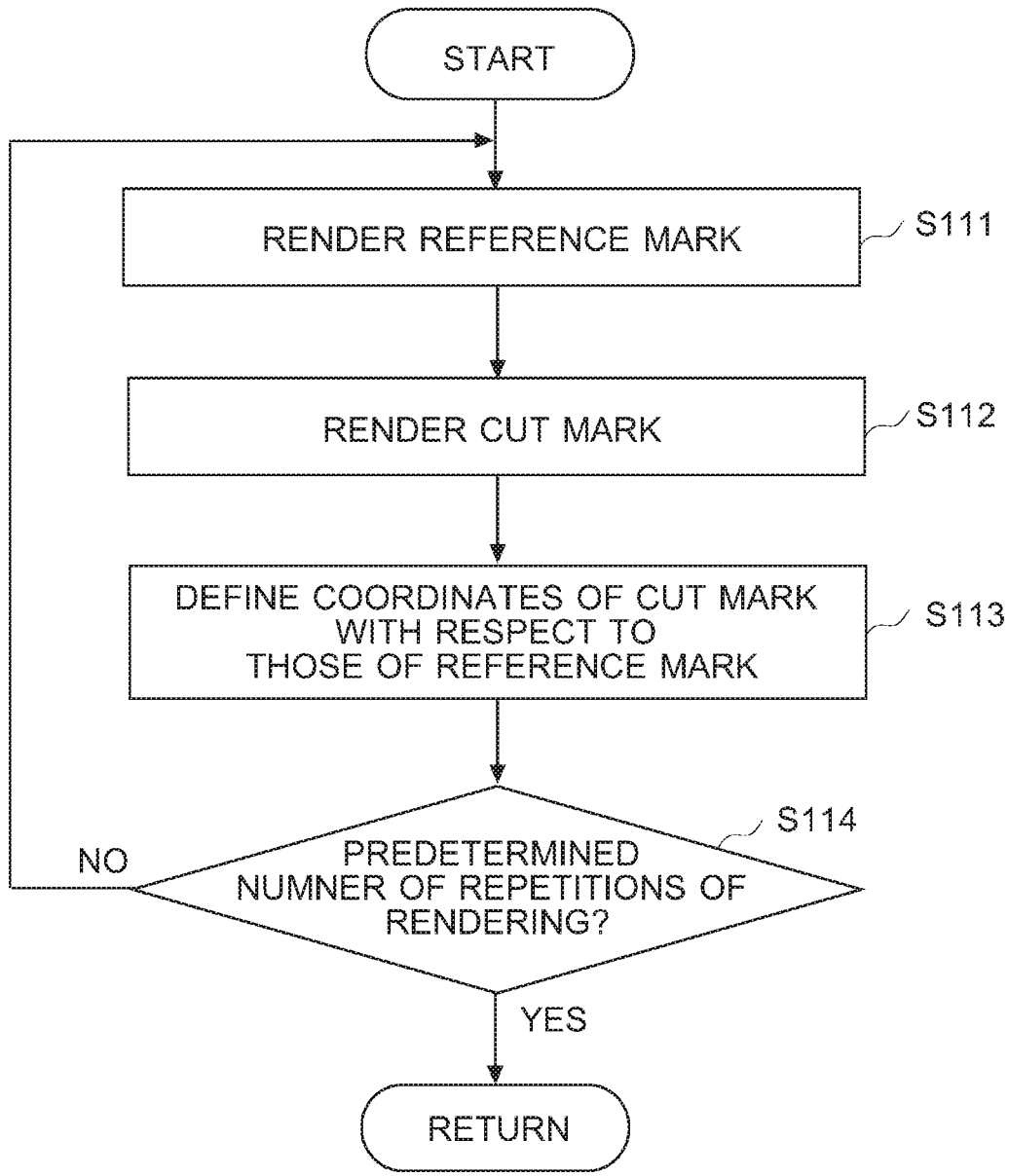
FIG. 19 is a flowchart illustrating an example of operations (creating an adjusting image) of the printer controller according to one embodiment of the present invention.
Figure 20:
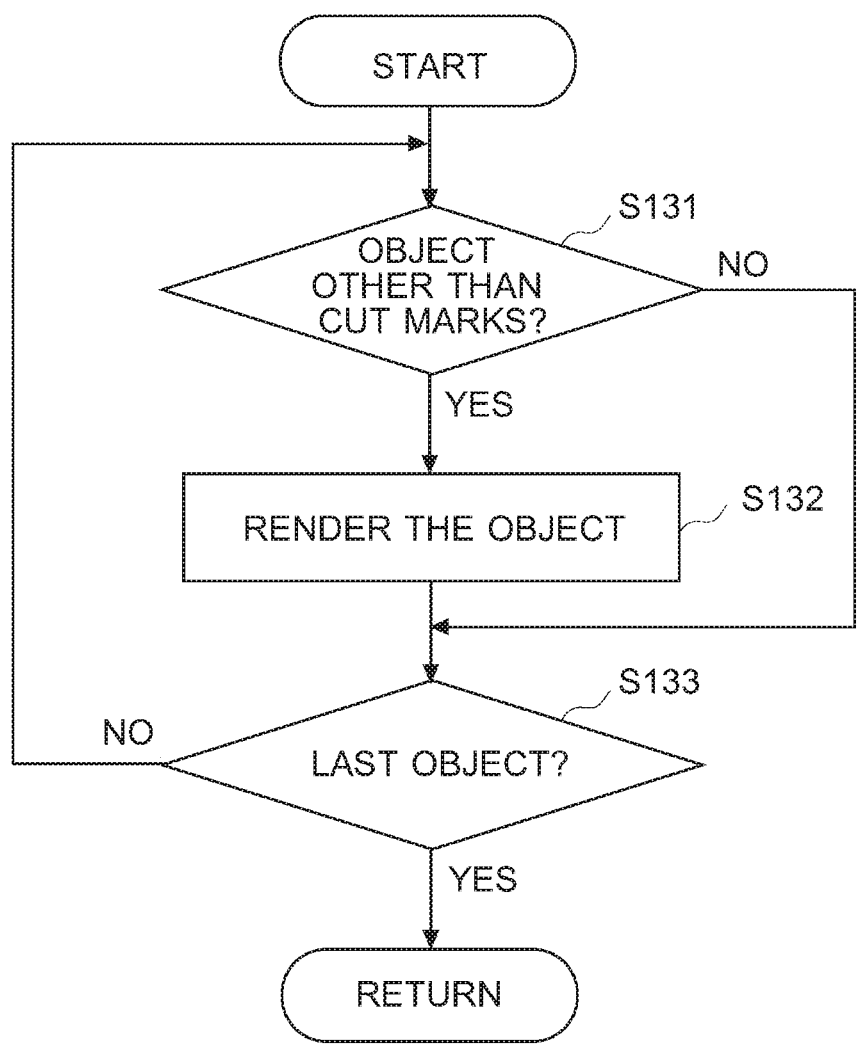
FIG. 20 is a flowchart illustrating an example of operations (creating an end product image) of the printer controller according to one embodiment of the present invention.

In order to describe an embodiment of the present invention in more in detail, a description is given of a label-printing control apparatus, a non-transitory computer-readable recording medium storing a label-printing control program and a label-printing control method, with reference to FIG. 1A through FIG. 20. FIGS. 1A and 1B are schematic diagrams illustrating examples of the constitution of a printing system according to the present embodiment. FIGS. 2A and 2B, FIGS. 3A and 3B and FIGS. 4A and 4B are block diagrams illustrating an example of the constitutions of a client terminal, a printer controller and a label printing devise in the printing system according to the present embodiment. FIGS. 5A to 5E are schematic diagrams illustrating label printing, and FIGS. 6 to 8 are diagrams illustrating print data and data created from the print data. FIG. 9 and FIGS. 10A and 10B are diagrams illustrating an example of conventional label printing using a continuous label stock on which pairs of cut marks were printed with being spaced apart from respective reference marks with fixed spaces. FIGS. 11 to 15B are diagrams illustrating examples of label printing according to the present embodiment, using a continuous label stock on which one or more specific images (one or more cut marks or one or more rectangles) were printed with being spaced apart from the respective reference marks with different spaces. FIGS. 16 and 17 are diagrams illustrating another example of label printing according to the present embodiment, using a continuous label stock on which scales were printed with being spaced apart from the respective reference marks with different spaces. Each of FIGS. 18 to 20 is a flowchart illustrating an example of operations of the printer controller according to the present embodiment.

As illustrated in FIG. 1A, printing system 10 according to the present embodiment includes at least one client terminal 20, printer controller 30 and label printing device 40. The client terminal 20, printer controller 30 and label printing device 40 are communicably connected to each other through communication network 60, where examples of the communication network 60 include a LAN (Local Area Network) and WAN (Wide Area Network) defined by specifications, such as Ethernet, Token Ring and PINY (Fiber-Distributed Data interface). Printer controller 30 and label printing device 40 may be communicably connected to each other with an exclusive line supporting, for example, PCI (Peripheral Component Interconnect) communication. Though printing system 10 illustrated in FIG. 1A includes label printing device 40 in which an in-line finisher is connected to a printing unit (print engine), printing system 10 may employ label printing device 40 and finisher 50 as separated devises as illustrated in FIG. 1B. Hereinafter, a description of each apparatus is given on the assumption of the constitution illustrated in FIG. 1A.

Client Terminal

Figure 2A:
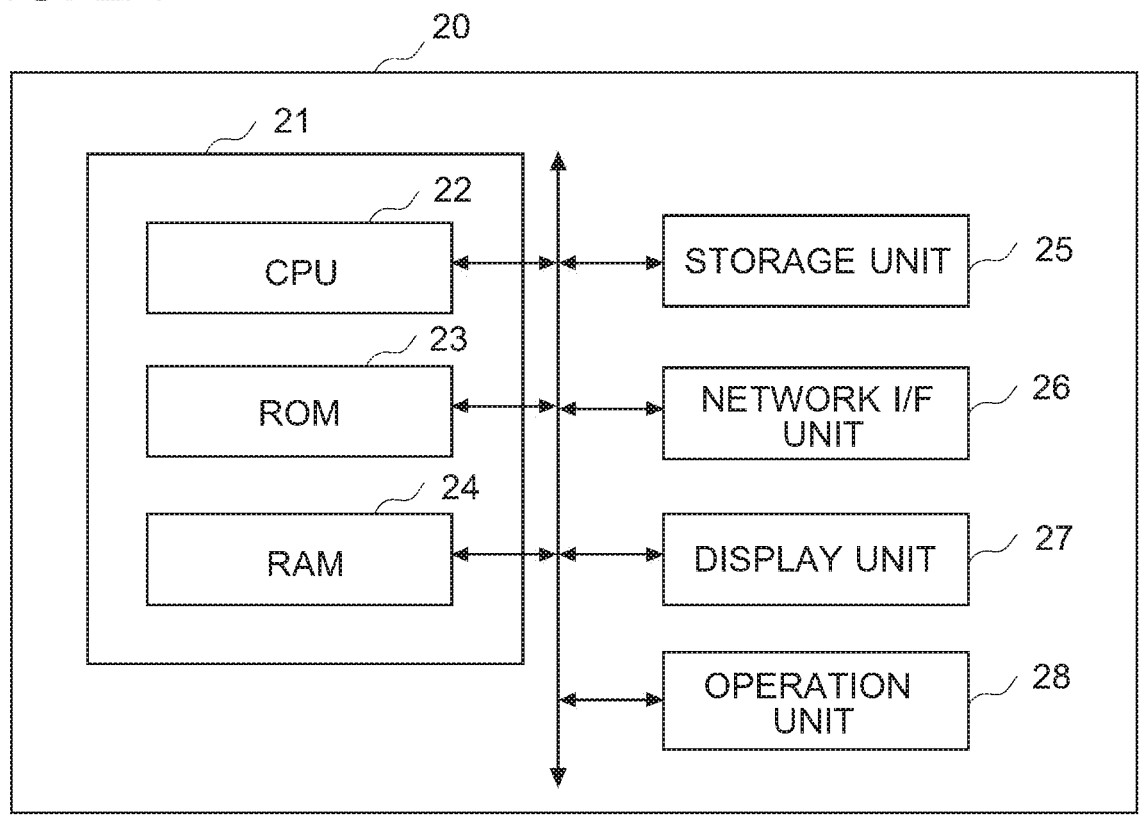
FIGS. 2A and 2B are block diagrams illustrating an example of the constitution of a client terminal in the printing system according to one embodiment of the present invention.

Client terminal 20 is a computing device, for example, a personal computer, that is configured, to send print data to printer controller 30. Client terminal 20 includes, as illustrated in FIG. 2A, built-in controller 21, storage unit 25, network interface (I/F) unit 26, display unit 27 and operation unit 28.

Figure 2B:
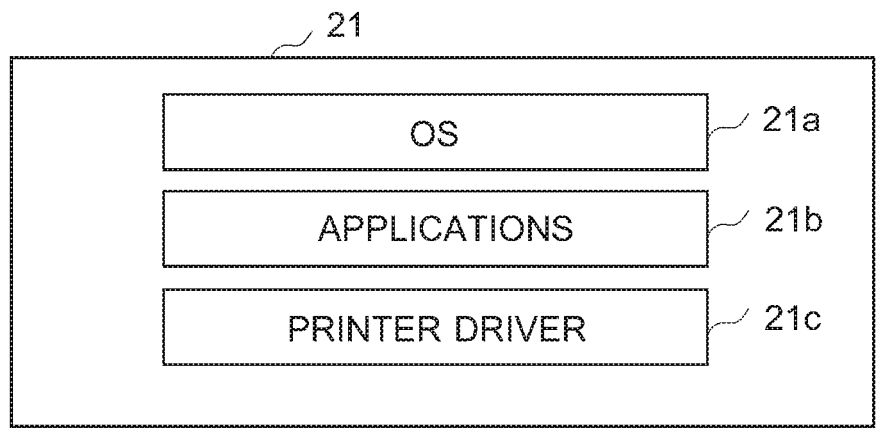

Built-in controller 21 includes CPU (Central Processing Unit) 22, and memories including ROM (Read Only Memory) 23 and RAM (Random Access Memory) 24. CPU 22 reads out control programs stored in ROM 23 or storage unit 25, loads the programs onto RAM 24, and executes the programs, thereby controlling the operations of client terminal 20. As illustrated in FIG. 2B, built-in controller 21 (CPU 22) is configured to execute OS (Operating System) 21a, applications 21b and printer driver 21c.

Examples of OS 21a include Microsoft Windows, macOS and Android, where Microsoft and Windows are either registered trademarks or trademarks of Microsoft Corporation in the United States and/or other countries, macOS is a registered trademark or trademark of Apple Inc. in the United States and/or other countries, and Android is a registered trademark or trademark of Google Inc. in the United States and/or other countries. OS 21a manages applications 21b and printer driver 21c in client terminal 20 so as to function and run the programs.

Applications 21b include, for example, an application program for creating labels (for example, pressure-sensitive labels), which, on sending print instructions, invokes printer driver 21c and transfers data created by one of applications 21b to printer driver 21c by being executed by CPU 22.

Printer driver 21c converts data created by one of applications 21b into print data in a language that printer controller 30 can interpret and sends the print data to printed controller 30, by being executed by CPU 22, where examples of the print data include PDL (Page Description Language) data written in page description languages, such as PJL (Printer Job Language), PS (PostScript) and PCL (Printer Control Language), and PDF (Portable Document Format) data. The print data contains images for printing, including one or more label images, one or more reference marks (so-called "eye marks") which are marks to tell an in-line finisher (or finisher 50) where to cut a continuous label stock, and one or more cut marks indicating shapes or contours to cut label images printed on a label stock into label shapes with a die. The print data further contains print setting information, which defines conditions for printing the one or more label images, the one or more reference marks and the one or more cut marks. In order to allow an operator to easily realize positioning of each cut mark with respect to a corresponding label image on a screen of a computing device, the one or more cut marks in the print data are, in general, set in a specific color (a spot color) which had been specified by an operator in advance.

Storage unit 25 includes a HDD (Hard Disk Drive) and/or a SSI (Solid State Drive). Storage unit 25 stores programs which, when being executed, cause CPU 22 to control various components of client terminal 20; print data; and others.

Network interface unit 26 includes a NIC (Network Interface Card) and/or a modem. Network interface unit 26 communicably connects client terminals 20 to communication network 60 so as to send print data to printer controller 30.

Display unit 27 includes a display like a LCD (liquid crystal display) or an OEL (organic electroluminescence) display, so as to display various screens including label creation screens of applications 21b and a print setup screen of printer driver 21c.

Operation unit 28 includes input devices, such as a mouse and a keyboard, which allows an operator to perform operations for label production and for positioning cut marks by using applications 21b and operations for configuration of print settings by using printer driver 21c.

Figure 3A:
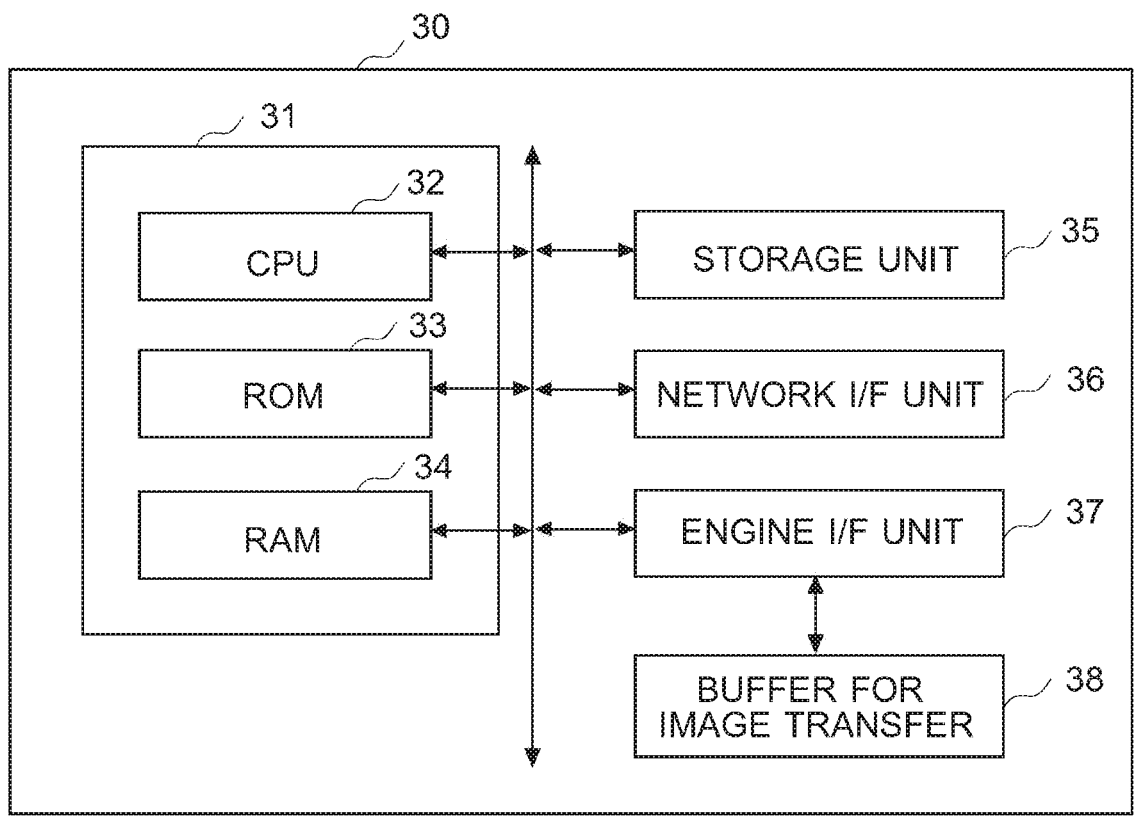
FIGS. 3A and 3B are block diagrams illustrating an example of the constitution of a printer controller in the printing system according to one embodiment of the present invention.

Printer Controller:

Printer controller 30 is a label-printing control apparatus configured to instruct label printing device 40 to perform print processing, by performing image processing, which includes rasterization and color conversion, on print data received from client terminal 20, and by transferring the processed image data to label printing device 40. The printer controller 30 includes, as illustrated in FIG. 3A, built-in controller 31, storage unit 35 and network interface (I/F) unit 36, engine interface (I/F) unit 37, and buffer 38 for image transfer.

Figure 3B:
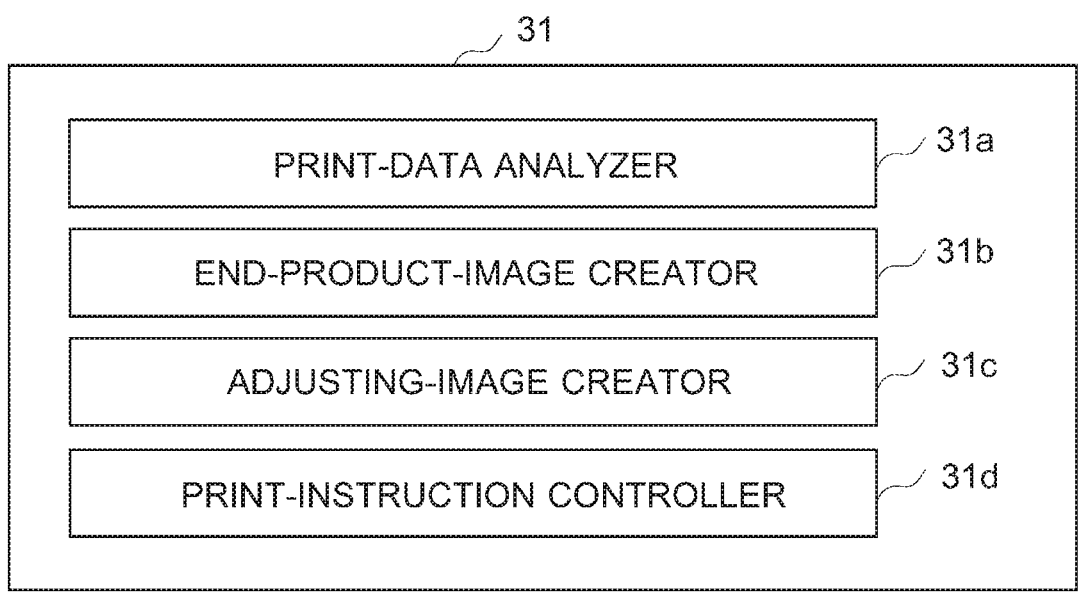

Built-in controller 31 includes CPU 32, and memories including ROM 33 and RAM 34. CPU 32 reads out control programs stored in ROM 33 or storage unit 35, loads the programs onto RAM 34, and executes the programs, thereby controlling the operations of printer controller 30. As illustrated in FIG. 3B, built-in controller 31 (CPU 32) is configured to work as print-data analyzer 31a, end-product-image creator 31b, adjusting-image creator 31c and print-instruction controller 31d.

Print-data analyzer 31a is configured to obtain print data from client terminal 20 to analyze the print data, and then extract, from images contained in the print data, a label image, a reference mark and a cut mark, where the reference mark is a mark used for determining a die-cutting position on a continuous label stock (in other words, for informing an in-line finisher of label printing device 40 or finisher 50 about where to cut a continuous label stock), and the cut mark represents a shape or contour to cut the label image printed on the continuous label stock. In concrete terms, print-data analyzer 31a performs the extraction process as follows. The print data includes one or more label images, one or more reference marks, and one or more cut marks. Since one or more cut marks in print data are specified to be a spot color in most cases, print-data analyzer 31a can extract the one or mare cut marks from the print data, by finding objects of the spot color among images contained in the print data by using, for example, tag bits. Since one or more reference marks in the print data have predetermined shape and predetermined size, print-data analyzer 31a can extract the one or more reference marks from the print data, by finding objects that have the predetermined shape and the predetermined size in the print data.

End-product-image creator 31b is configured to create an end product image prepared by removing the one or more cut marks extracted by print-data analyzer 31a, from the print data, in other words, create an end product image including the reference mark and the label image corresponding to the reference mark.

Adjusting-image creator 31c is configured to create an adjusting image including reference marks and one or more specific images corresponding to each of the reference marks, where each specific image is created from the cut mark (a figure such as the cut mark, a rectangle circumscribed about the cut mark, or a scale including graduations marked to cover the area of the cut mark). In this process, adjusting-image creator 31c arranges the specific images to be spaced apart from the respective reference marks with different distances between each reference mark and one or more corresponding specific images (with increasing or decreasing distances at fixed intervals or at intervals changing in a stepwise manner), in the machine direction of a continuous label stock or in both the machine direction and the cross-machine direction of a continuous label stock, to create the adjusting image. In most cases, reference marks are created in a single color of black. In this process, adjusting-image creator 31c may create also the specific images (figures such as cut marks, rectangles each circumscribed about the cut mark, or scales each including graduations covering the area of the cut mark) in a single color of black. It can reduce the consumption of toner in label printing device 40 and increase visibility of the specific images (figures such as cut marks, rectangles circumscribed about the respective cut marks, or scales) printed on a continuous label stock.

Print-instruction controller 31d is configured to send label printing device 40 through engine interface unit 37 instructions to print data of the end product image created by end-product-image creator 31b, and data of the adjusting image created by adjusting-image creator 31c on a continuous label stock, by storing the data of the end product image and the data of the adjusting image (image data) into buffer 38 for image transfer. In printing system 10 according the present embodiment, that employs label printing device 40 in which an in-line finisher is connected to a printing unit, or another type of printing system 10 that employs finisher 50 configured to perform die-cutting on a continuous label stock in order of print processing with label printing device 40 on the continuous label stock, print-instruction controller 31d instructs label printing device 40 (in other words, stores the image data into the buffer 38 for image transfer) so as to print the adjusting image before the end product image on the continuous label stock. In another type of minting system 10 which employs finisher 50 configured to perform die-cutting on a continuous label stock in reverse order of print processing with label printing device 40 on the continuous label stock (in other words, printing system 10 in which label printing device 40 and finisher 50 are provided as separated devises, a continuous label stock printed by label printing device 40 is wound in roll form, the roll label stock is set to finisher 50, and the finisher 50 is caused to die-cut the label stock), print-instruction controller 31d instructs label printing device 40 to print the adjusting image after the end product image on the continuous label stock.

Herein, the above-mentioned print-data analyzer 31a, end-product-image creator 31b, adjusting-image creator 31c and print-instruction controller 31d may be constituted as hardware devices. Alternatively, the above-mentioned print-data analyzer 31a, end-product-image creator 31b, adjusting-image creator 31c and print-instruction controller 31d may be provided by a label printing control program which causes built-in controller 31 to function as these sections when being executed by CPU 32. That is, built-in controller 31 may be configured to serve as the print-data analyzer 31a, end-product-image creator 31b, adjusting-image creator 31c and print-instruction controller 31d, when CPU 32 executes the label printing control program.

Storage unit 35 includes a HDD and/or a SSD. Storage unit 35 stores programs which, when being executed, cause CPU 32 to control various components of printer controller 30; print data received from client terminal 20; data of an end product image; data of an adjusting image; and others.

Network interface unit 36 includes a NIC and/or a modem. Network interface unit 36 communicably connects printer controller 30 to communication network 60, to receive print data from client terminal 20.

Engine interface unit 37 includes a NIC and/or a modem. Engine interface unit 37 communicably connects printer controller 30 to label printing device 40, to send data of the end product image and data of the adjusting image to label printing device 40 so as to cause the label printing device 40 to print the end product image and the adjusting image successively on a continuous label stock. Buffer 38 for image transfer is connected to engine interface unit 37. Buffer 38 for image transfer is a buffer for temporally storing image data so as to transfer images to label printing device 40.

Figure 4A:
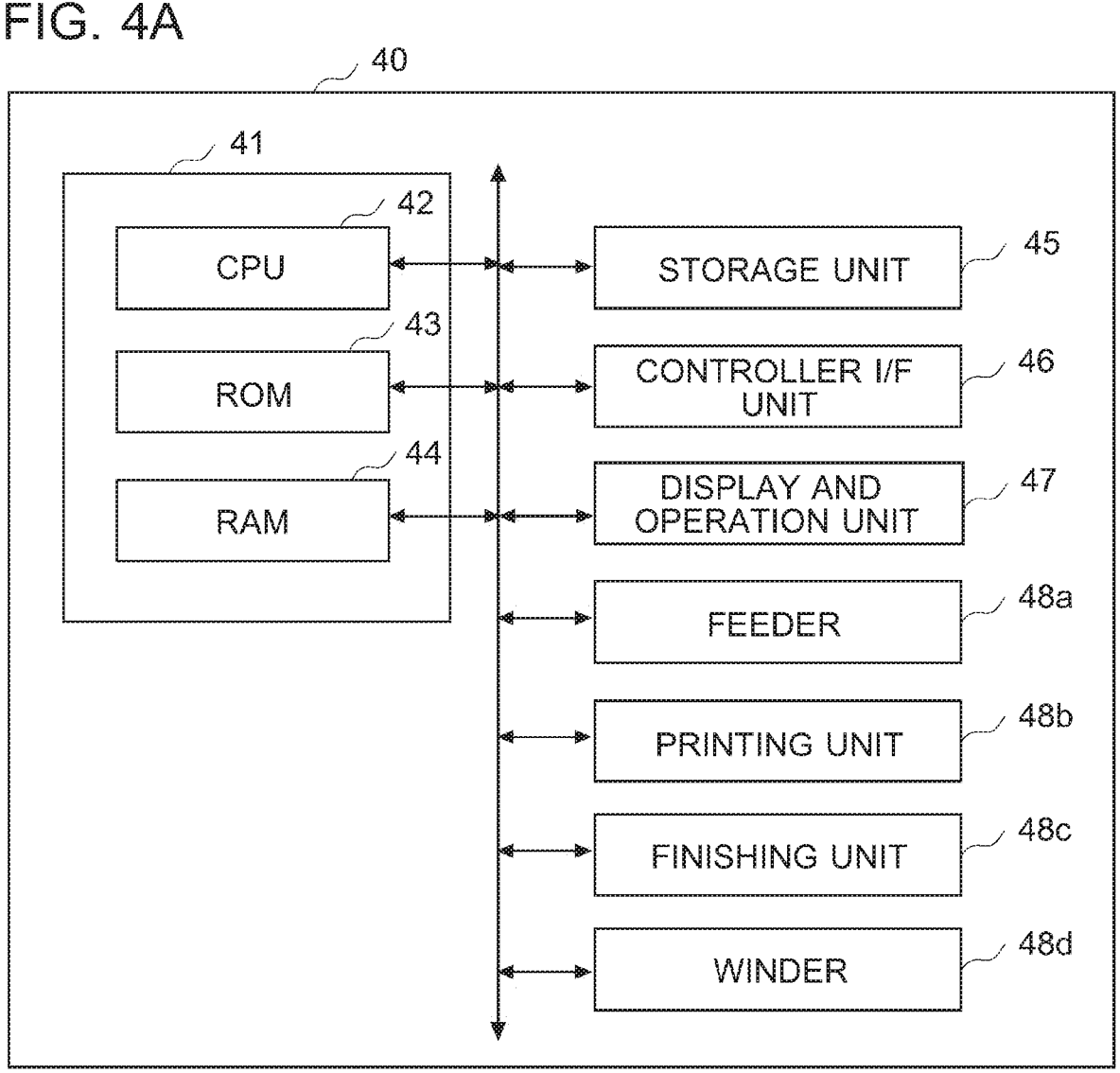
FIGS. 4A and 4B are block diagrams illustrating an example of the constitution of a label printing device in the system according to one embodiment of the present invention.

Label Printing Device:

Label printing device 40 is a printing device configured to perform label printing on a roll or continuous label stock on the basis of data of the end product image and data of the adjusting image sent from printer controller 30, and to perform finishing processing by die-cutting the label stock and removing waste from the label stock after the die-cutting. As illustrated in FIG. 4A, label printing device 40 includes built-in controller 41, storage unit 45, controller interface (I/F) unit 46, display and operation unit 47, feeder 48a, printing unit 48b, finishing unit 48c and winder 48d.

Built-in controller 41 includes CPU 42, and memories including ROM 43 and RAM 44. CPU 42 reads out control programs stored in ROM 43 or storage unit 45, loads the programs onto RAM 44, and executes the programs, thereby performing the operations of label printing device 40.

Storage unit 45 includes a HDD and/or a SSD. Storage unit 45 stores programs which, when being executed, cause the CPU 42 to control various components of label printing device 40; information about processing and functions of label printing device 40; data of an end product image; data of an adjusting image; and others.

Controller interface unit 46 includes a NIC and/or a modem. Controller interface unit 46 communicably connects label printing device 40 to printer controller 30 so as to receive data of an end product image and data of an adjusting image (image data) from printer controller 30.

Display and operation unit 47 is configured to display various screens relating to print processing and allow an operator to perform various operations relating to printing on the screens. Examples of display and operation unit 47 include a touch screen in which a pressure-sensitive operation unit (a touch sensor) composed of lattice-shaped transparent electrodes is arranged on a display unit.

Figure 4B:
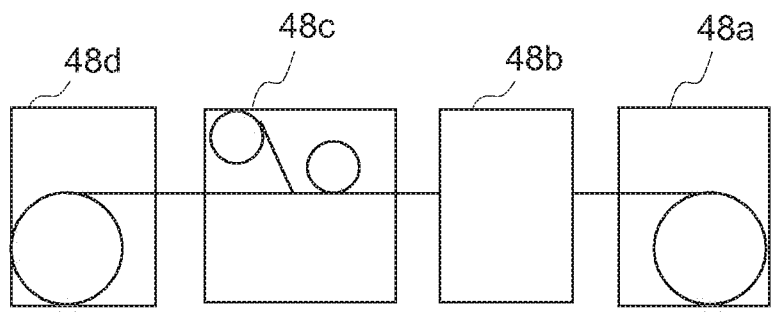

Feeder 48a is configured to feed a continuous label stock provided in roll form to print processor 48b as illustrated in FIG. 4B.

Printing unit 48b (print engine) is configured to print an end product image and an adjusting image successively on a continuous label stock fed by feeder 48a as illustrated in FIG. 4B. Printing unit 48b includes, for example, an exposure unit, an image forming unit, an intermediate transfer belt, a secondary transfer roller and a fixing unit. The exposure unit is configured to irradiate a photoreceptor drum with a laser beam in accordance with image data, to perform exposure processing. The image forming unit includes photoreceptor drums, developing units, charging units, photoreceptor cleaning units, and primary transfer rollers, and is configured to form a toner image in each color of C, M, Y, and K. The intermediate transfer belt is rotated by rollers and functions as an intermediate transfer body to convey toner images formed by the image forming unit to a continuous label stock. The secondary transfer roller transfers toner images formed on the intermediate transfer belt onto the continuous label stock. The fixing unit fixes toner images transferred onto the continuous label stock.

Finishing unit 48c is configured to die-cut label images, that were printed on the label stock by printing unit 48b, into label shapes, while sensing reference marks printed on the label stock, and to remove the part of the face material surrounding the labels (referred to as waste), from the label stock on which the die-cutting was performed, as illustrated in FIG. 4B.

Winder 48d is configured to wind the label stock from which waste has been removed by finishing unit 48c (the label stock after the process of removing waste), into a roll, as illustrated in FIG. 4B. The label stock from which waste has been removed can be checked visually in the period of time after the process of removing waste with finishing unit 48c and before the process of winding the label stock with winder 48d. It allows determination of the displacement amount of die-cutting, from the remaining part of the printed adjusting image on the label stock from which waste has been removed, and adjustment of the die-cutting position on the label stock or the priming position of the end product image on the label stock (particularly the printing positions of the label images), on the basis of the displacement amount. It realizes an accurate process of die-cutting the end product image printed on the label stock, which is to be executed after the process of die-cutting the adjusting image printed on the label stock.

It should be noted that FIGS. 1A to 4B show printing system 10 according to the present embodiment for illustrative purpose only, and the structure and control of each given apparatus can be modified appropriately as far as the modified devices can realize the label-printing control operations according to the present embodiment. For example, printing system 10 illustrated in each of FIGS. 1A and 1B includes printer controller 30 and label printing device 40 as separated devices, but printing system 10 may alternatively employ label printing device 40 including printer controller 30. In this printing system 10, built-in controller 41 of label printing device 40 may be configured to serve as the print-data analyzer, the end-product-image creator, the adjusting-image creator and the print-instruction controller (by executing label-printing control program by CPU 42). In the case that printing system 10 includes label printing device 40 and finisher 50 as separated devices, as illustrated FIG. 1B, finisher 50 may include a feeder, a finishing unit and a winder, where the feeder is configured to feed, to the finishing unit, a continuous label stock printed by label printing device 40 and provided in roll form, the finishing unit is configured to perform the processes of die cutting and removing waste on the label stock, and the winder is configured to wind the label stock after the process of removing waste, into a roll.

Next, a description is given of ordinary label printing with reference to FIGS. 5A to 5E.

Figure 5A:
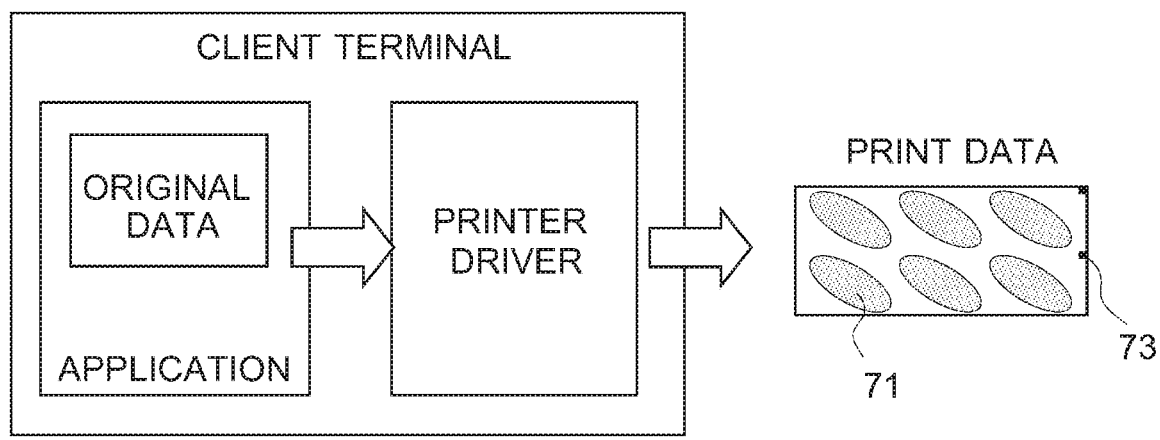
FIGS. 5A to 5E are schematic diagrams illustrating label printing.

First, after an operator creates data for label priming (original data) by using an application in a client terminal, printer driver creates print data including label images 71 and reference marks 73 and then outputs the print data to a printer controller (see FIG. 5A).

Figure 5B:
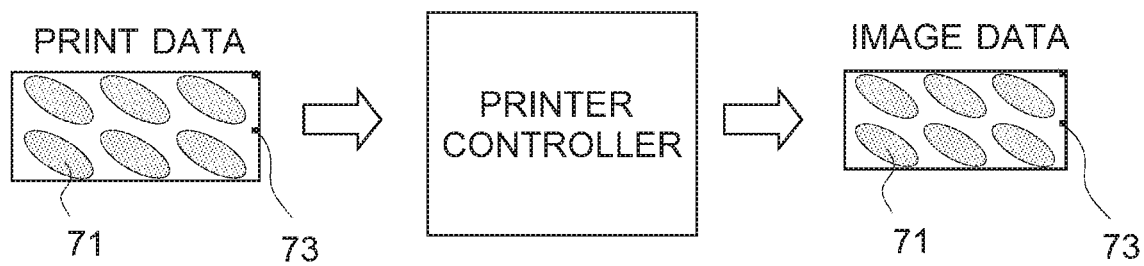

The printer controller rasterizes the print data, and then creates image data including label images 71 and reference marks 73, to send, the image data to a label printing device (see FIG. 5B).

Figure 5C:
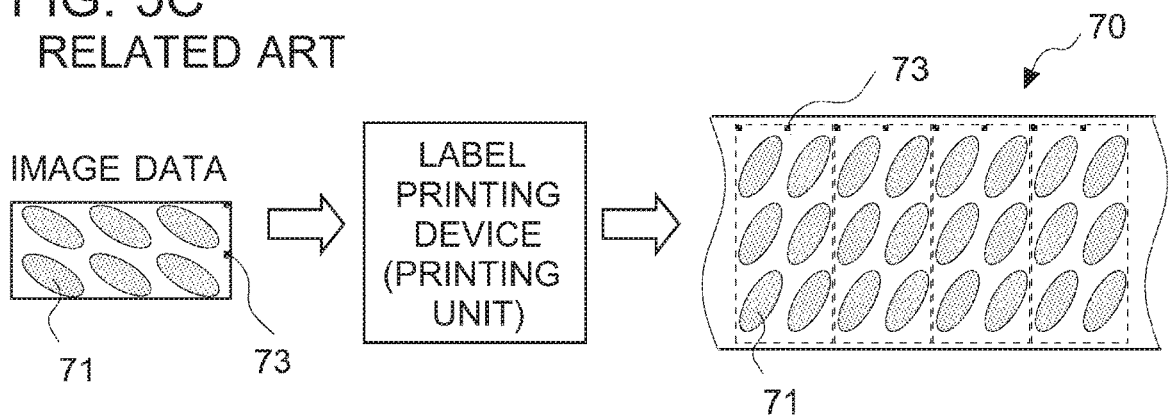

A printing unit of the label printing device uses label stock 70 provided in roll form and prints an array of a specified number of label images 71 and corresponding reference marks 73 on label stock 70 on the basis of the image data (see FIG. 5C).

Figure 5D:
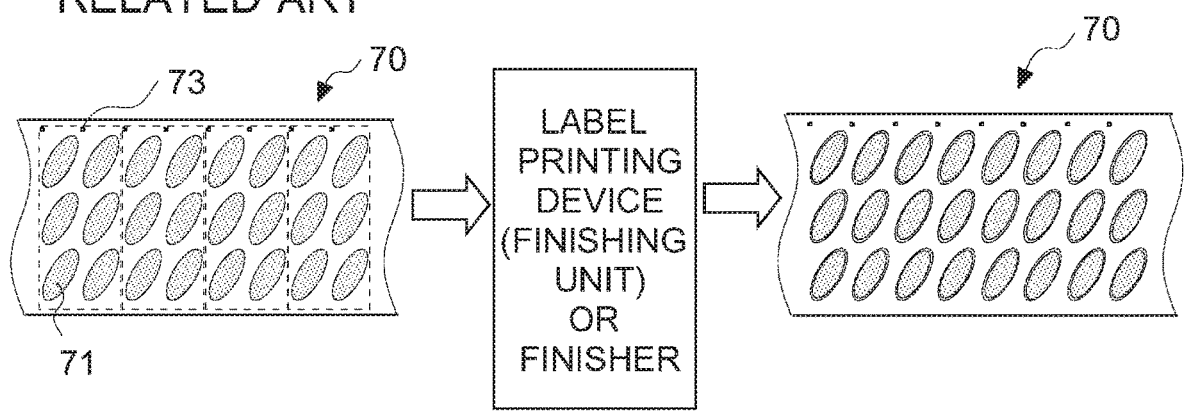
Figure 5E:
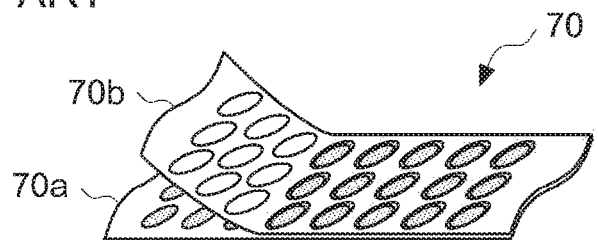

A finishing unit of the label printing device (or a finisher) cuts the printed label images 71 into label shapes while sensing reference marks 73 and adjusting die-cutting positions on the basis of reference marks 73 (see FIG. 5D). The finishing unit (or the finisher) further removes a part of the face material (waste 70b) surrounding the die-cut labels to separate the waste 70b from label stock 70, to obtain label stock 70a without waste, which is die-cm labels on a release liner (see FIG. 5E).

As described above, the finishing unit (or the finisher) adjusts the die-cutting positions by sensing printed reference marks 73, but a positional error of the die-cutting can occur, depending on the mounting accuracy of a cutting tool (die) used for cutting label images 71 into label shapes. In view of that, conventional label production processing employed processes to cut a specific number of label images by a finishing unit or a finisher, check the displacement of die-cutting positions visually by an operator, and adjust the die-cutting positions by the operator. These processes were repeated until the die becomes to cut printed label images at desired positions on the label stock. It resulted in a problem about wasteful consumption of consumables, such as a label stock and toner, and wasteful use of man-hours of an operator.

In view of the problem, label-printing operations according to the present embodiment employs the following processes. That is, the label-printing operations employs a process of printing an adjusting image in an area separated from a printing area of label images on a continuous label stock, where the adjusting image includes reference marks used for determining a die-cutting position on the continuous label stock; and one or more specific images, each indicating the positions to cut a label image printed on the continuous label stock, corresponding to each reference mark. The specific images are arranged to be spaced apart from the respective reference marks with different distances in the adjusting image, so that an operator can recognize the accurate displacement amount of die-cutting positions on the label stock from the respective printing positions of label images on the label stock. The specific image is a figure created from a cut mark, and examples of the specific image include the cut mark itself, a rectangle circumscribed about the cut mark and a scale including graduations covering the area of the cut mark. A detailed description of the operations is given below.

First, a description is given of print data to be used for label printing, with reference to FIG. 6. The print data includes information of one or more label images 71, one or more cut marks 72, and one or more reference marks 73. In label printing, one or more label images 71 created by a customer or a designer are arranged according, to the size of a label stock to be used for the label printing and/or specifications about the image size that label printing device 40 can handle. FIG. 6 illustrates print data DATA0 including two label images 71 arranged to fit the width of a label stock. Further, cut marks 72 to be used for cutting the label images 71 into label shapes, are arranged on or around the respective label images 71. In ordinary label printing, cut marks 72 are created in a spot color, so as to be used by an operator to check the positions of cut marks 72 on the screen of display unit 27 of client terminal 20 and not to be used for actual printing of label images 71. Further, reference mark 73 is arranged adjacent to one or more label images 71 according to the specifications of finishing unit 48c (or finisher 50), where the reference mark 73 is used as the basis of positioning of die-cutting to be performed by finishing unit 48c (or finisher 50). The reference mark 73 generally has a shape of black rectangle with sides within one centimeter.

In ordinary label printing, printer controller 30 obtains image data prepared by removing data of cut marks 72 (referred to as cutting data) from print data created by client terminal 20, and sends the image data to label printing device 40 to instruct the label printing device 40 to perform print processing. The cutting data is generally used just for creating a die for cutting a label stock into a label shape, but label-printing operations according to the present embodiment uses print data including the cutting data (including cut marks 72).

FIG. 7 illustrates image data created from print data DATA0 including cutting data. When receiving print data DATA0 including cutting data, printer controller 30 creates image data DATA1 and image data DATA2 from print data DATA0. Image data DATA1 is used as an end product image, and the end product image is an image prepared by removing cut marks 72 from images contained in print data DATA0, in other words, is an image including one or more reference marks 73 and one or more label images 71 corresponding to each reference mark 73. Image data DATA2 includes one or more reference marks 73 and one or more specific images each created from cut mark 72 (in this case, the one or more specific images are cut marks 72) corresponding to each reference mark 73, and is used for creating an adjusting image.

Next, a description is given of an example of steps for creating the adjusting image. Printer controller 30 creates an image illustrated in FIG. 8 from print data. DATA0, where the image corresponds to image data DATA2 in FIG. 7 and includes one or more reference marks 73 and one or more cut marks 72 corresponding to each reference mark 73. In concrete terms, from print data DATA0, printer controller 30 extracts an object for which a spot color is specified and determines the object as cut mark 72. From print data DATA0, printer controller 30 further extracts a graphic object created in color of K=100% in rectangular shape with sides within 10 millimeters, and determines the object as reference mark 73. Printer controller 30 then arrange sets of reference mark 73 and one or more cut marks 72 while changing the distance between the reference mark 73 and the one or more cut marks 72, to create the adjusting image, as described in details below. The adjusting image may be created so as to cause label printing device 40 to print cut marks 72 in color of K=100%.

Since the name of the spot color specified to cut mark 72 depends on operator's environment, printing system 10 may be configured to prompt an operator to specify the name of the spot color of cut mark 72 by using printer driver 21c, and then cause printer controller 30 to process an object to which the name of the spot color is specified, as cut mark 72. A use of the adjusting image in the label printing provides the following effects. Even when a displacement of die-cutting positions occurs, the die cutting positions can be easily adjusted on the basis of the printed cut marks 72, since the cut marks 72 have the same shape as that of a die for use in the die-cutting. Further, since cut marks 72 are contours constituted by just lines, the amount of consumption of toner in printing cut marks 72 can be reduced in comparison with that in printing label images 71.

Next, a description is given of an arrangement of cut marks 72 (the layout of reference marks 73 and one or more cut marks corresponding to each of the reference marks 73) in the adjusting image, by using a comparison between conventional label printing and label printing according to the present embodiment.

FIG. 9 illustrates an example of an adjusting image printed on a continuous label stock in conventional label printing. In the conventional label printing, sets of reference mark 73 and corresponding cut marks 72 are printed on label stock 70 with keeping the same positional relationship between reference mark 73 and corresponding cut marks 72 for every set. In other words, in the adjusting image, cut marks 72 are spaced apart from each reference mark 73 with the fixed distance being kept. In this case, as illustrated by the broken line in FIG. 9, the top position of each reference mark 73 and the top position of a pair of cut marks 72 corresponding to the each reference mark 73 match in the machine direction of label stock 70 (the direction going to the left of FIG. 9).

FIGS. 10A and 10B illustrate an example of the label stock 70 of FIG. 9 after a process of die cutting without performing adjustment of die-cutting position (FIG. 10A), and after a process of removing waste from the label stock (FIG. 10B). Finishing unit 48c (finisher 50) performs die-cutting on label stock 70 at fixed intervals while sensing reference marks 73, which results in the same displacement amount of the actual cutting position 74 from the printing position of the corresponding cut mark 72 in the machine direction of label stock 70, for every cutting position 74. An operator can visually check label stock 70a after a process of removing waste, to recognize the displacement amount of die-cutting positions, and adjust the die-cutting positions on the basis of the displacement amount. In this case, the same appearance of cut mark 72 remains on each label (the part of the label stock face inside each culling position 74) given after the process of removing waste, and it makes the intuitive recognition of the displacement amount difficult.

Figure 11:
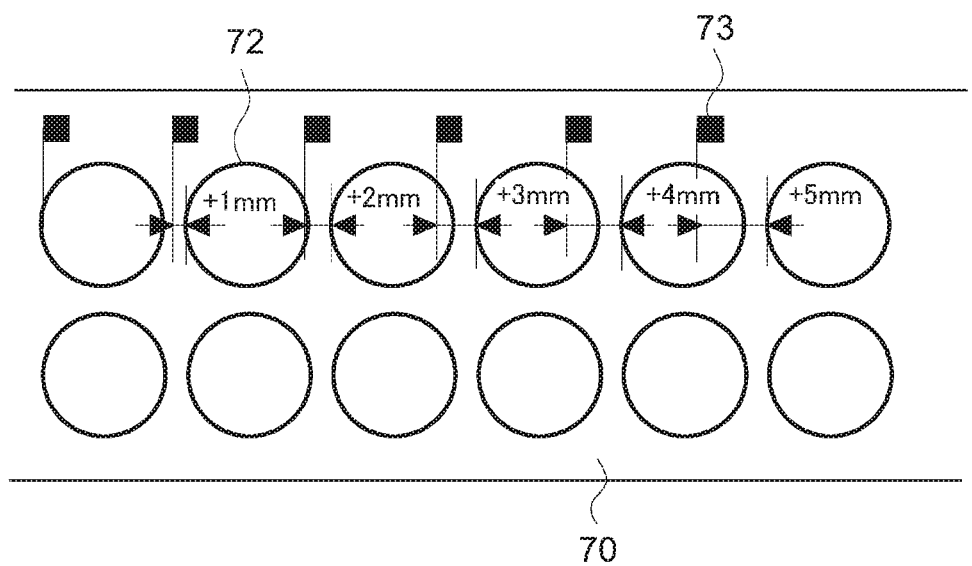
FIG. 11 is a diagram illustrating an example of a continuous label stock on which pairs of cut marks were printed with being spaced apart from respective reference marks with different spaces.

FIG. 11 illustrates an example of the adjusting image printed on a continuous label stock in label printing according to the present embodiment. In this example, in the adjusting image, pairs of cut marks 72 are spaced apart from respective reference marks 73 with different distances in the machine direction of label stock 70 (the horizontal direction of FIG. 11). The distance (shift amount) of the cut marks 72 from each reference mark 73 may be changed (increased or decreased) at fixed intervals or at intervals changing in a stepwise manner. In the case of FIG. 11, pairs of cut marks 72 are spaced apart from respective reference marks 73 in the machine direction of label stock 70 (the direction going to the right of FIG. 11), with the distances from the corresponding reference mark 73 increasing by 1 millimeter. The shift amounts of cut marks 72 from respective reference marks 73 (the distances of cut marks 72 from respective reference mark 73) may be defined by an operator arbitrarily. Further, the shift amounts (values from mm to +5 mm) may be added inside respective cut marks 72 in the adjusting image, to be printed inside respective cut marks 72, as illustrated in FIG. 11. In the case of FIG. 11, pairs of cut marks 72 are spaced apart from respective reference marks 73 with different distances in the machine direction of label stock 70 (in the horizontal direction of FIG. 11). Alternatively, the pairs of cut marks 72 may be spaced apart from respective reference marks 73 with different distances in the cross-machine direction of label stock 70 (in the vertical direction of FIG. 11), with the different distances of cut marks 72 from corresponding reference mark 73.

Figure 12A:
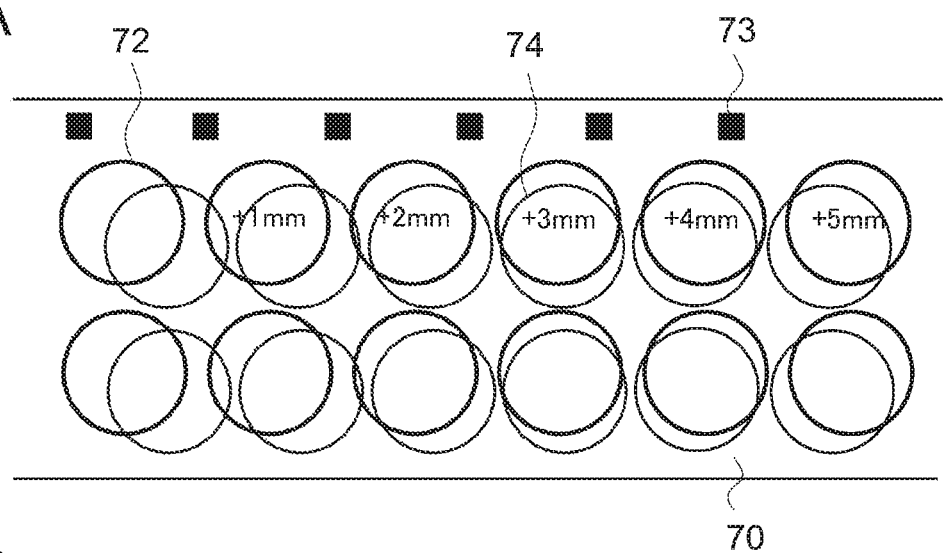
FIGS. 12A and 12B are diagrams illustrating the continuous label stock of FIG. 11 after a process of die-cutting without performing adjustment of die-cutting positions, and after a process of removing waste from the continuous label stock, respectively.
Figure 12B:
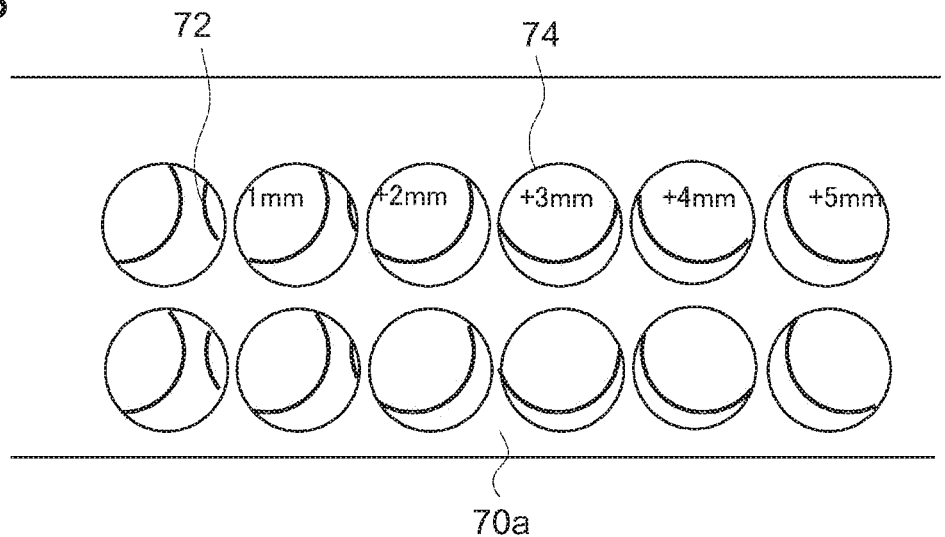

FIGS. 12A and 12B illustrate an example of the label stock 70 of FIG. 11 (on which pairs of cut marks 72 are spaced apart from respective reference marks 73 with different distances) after a process of die-cutting without performing adjustment of die-cutting position (FIG. 12A), and after a process of removing waste from the label stock (FIG. 12B). Similarly to the example of FIG. 9 and FIGS. 10A and 10B, finishing unit 48c (finisher 50) performs die-cutting on label stock 70 at fixed intervals while sensing reference marks 73, which results in that the displacement amounts of the actual cutting positions 74 from the respective printing positions of cut marks 72, are different from each other, because cut marks 72 are spaced apart from respective reference marks 73 with the different distances. An operator can visually check label stock 70a after a process of removing waste, to find a label on which the displacement amount of cutting position 74 from the printing position of the corresponding cut mark 72 is the minimum (the label on which the part of printed cut mark 72 remaining on the label looks bilaterally symmetric; in this case, the fourth label from the left in FIG. 12B). From the value (+3 mm) printed on this label, which is the shift amount from the corresponding reference mark 73, the operator can recognize the current displacement amount of die-cutting positions (in other words, the correction amount of die-cutting positions). In the example given by FIG. 11 and FIGS. 12A and 12B, cut marks 72 are shifted, to be spaced apart from respective reference marks 73 in the adjusting image and on label stock 70, but each reference mark 73 may be shifted, to be spaced apart from corresponding cut marks 72.

Figure 13:
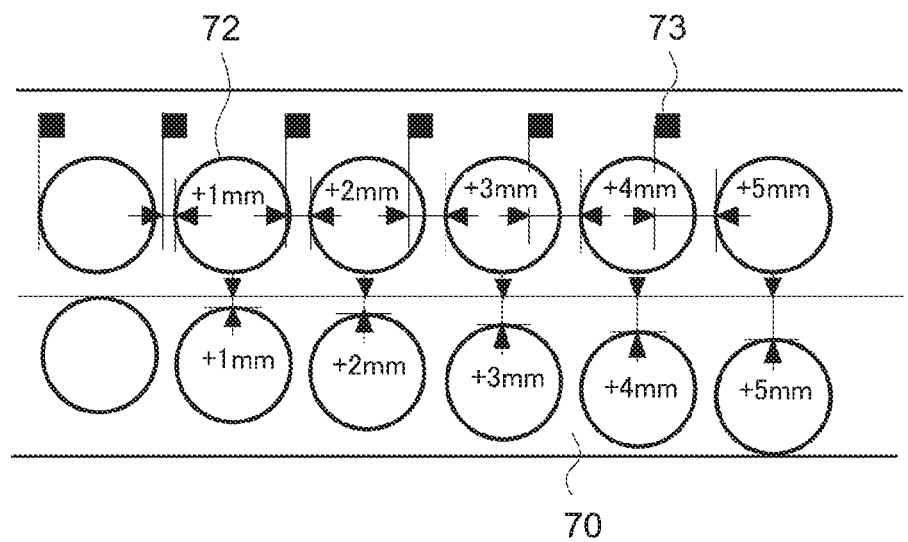
FIG. 13 is a diagram illustrating an example of a continuous label stock on which cut marks were printed with being spaced apart from respective reference marks in both the machine direction and the cross-machine direction of the continuous label stock.

FIG. 13 illustrates another example of the adjusting image printed on a continuous label stock in label printing according to the present embodiment. In this example, in the adjusting image, cut marks 72 are spaced apart from respective reference marks 73 with different distances in the machine direction (the horizontal direction of FIG. 13) and the cross-machine direction (in the vertical direction of FIG. 13) of label stock 70. In this example, cut marks 72 closer to reference mark 73 (cut marks 72 in the upper line in FIG. 13) are spaced apart from the respective reference marks 73 with increasing distances by 1 millimeter in the machine direction (the direction going to the right of FIG. 13), and cut marks 72 farther from reference mark 73 (cut marks 72 in the lower line in FIG. 13) are spaced apart from respective reference marks 73 with increasing distances by 1 millimeter in the machine direction and (the right direction of FIG. 13) and by 1 millimeters in the cross-machine direction (in the bottom direction of FIG. 13) of label stock 70. Similarly to the example of FIG. 11 and FIGS. 12A and 12B, the shift amounts of cut marks 72 from respective reference marks 73 (the distances of cut marks 72 from respective reference mark 73) may be defined by an operator arbitrarily. The shift amounts (values from +1 mm to +5 mm) in the machine direction and/or the cross-machine direction may be added inside respective cut marks 72 in the adjusting image, to be printed inside respective cut marks 72 as illustrated in FIG. 13. The arrangement of cut marks 72 being apart from respective reference marks 72 with the different distances in the machine direction and the cross-machine direction of label stock 70, allows an operator to recognize the displacement amounts of die-cutting positions in both the machine direction and the cross-machine direction at once.

Figures 14A, 14B:
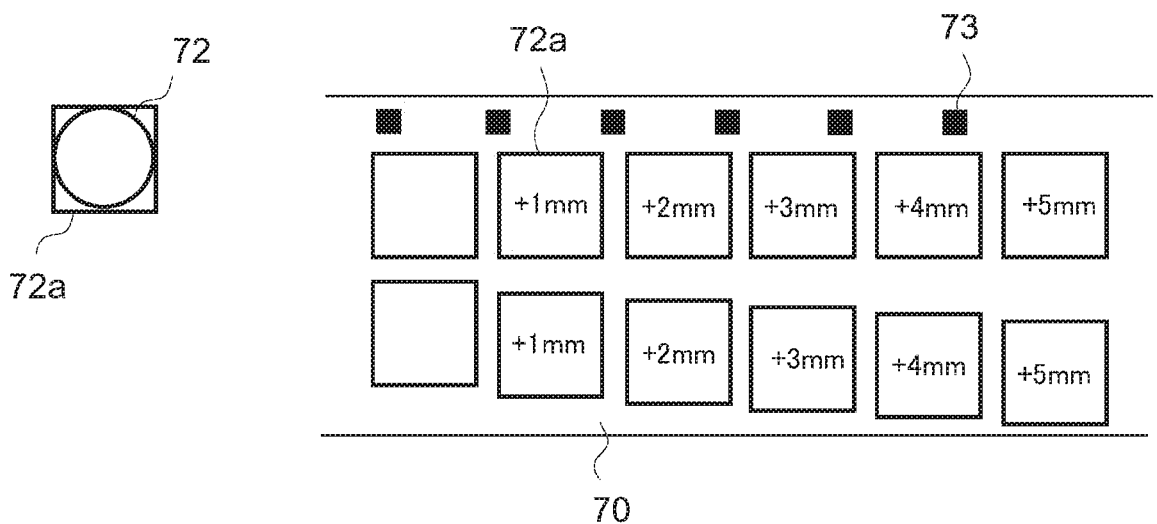
FIGS. 14A and 14B are diagrams illustrating an example of a continuous label stock on which rectangles each circumscribed about a cut mark were printed with being spaced apart from respective reference marks.

FIGS. 14A and 14B illustrate another example of the adjusting image printed on a continuous label stock in label printing according to the present embodiment. In this example, in place of cut marks 72, rectangles 72a each circumscribed about cut mark 72, are spaced apart from respective reference marks 73 with the different distances in the adjusting image, to be printed on label stock 70. In general, there are labels of various shapes, such as circle and oval additionally to rectangle. For creating circle or oval labels, cut marks also being circle or oval are used, which can result in that an operator hardly recognizes the displacement amount of die-cutting positions, on the basis of the appearance of label stock 70a given after a process of removing waste. In view of that, built-in controller 31 of printer controller 30 may create rectangle 72a circumscribed about cut mark 72 as illustrated in FIG. 14A, and print an adjusting image including rectangles 72a being spaced apart from respective reference marks 73 with different distances as illustrated in FIG. 14B.

Figure 15A:
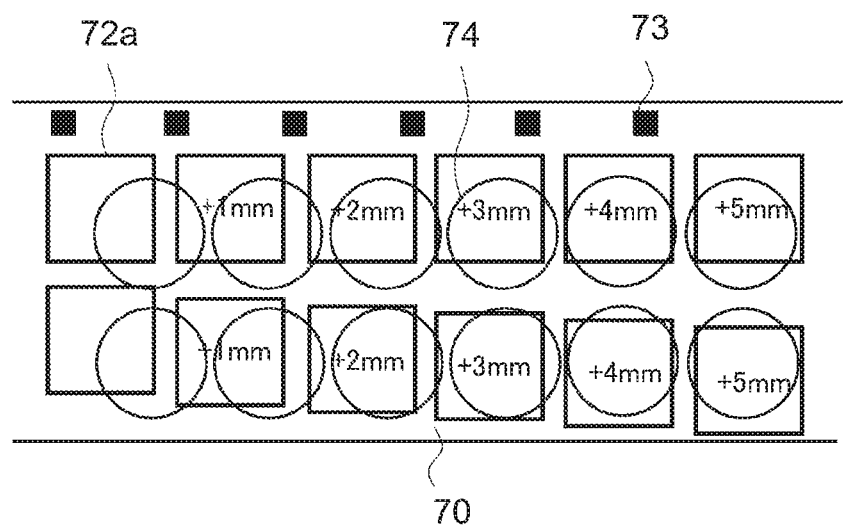
FIGS. 15A and 15B are diagrams illustrating the continuous label stock of FIG. 14B after a process of die-cutting without performing adjustment of die-cutting positions, and after a process of removing waste from the continuous label stock, respectively.
Figure 15B:
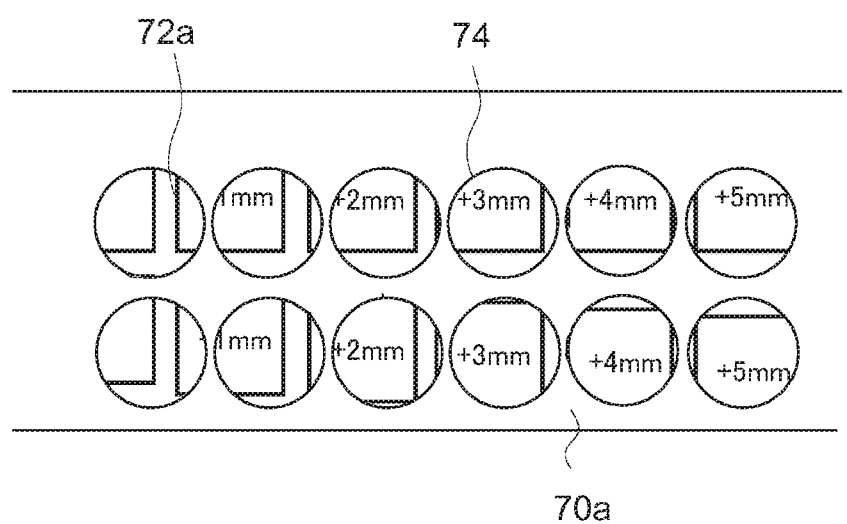

FIGS. 15A and 15B illustrate an example of the label stock 70 of FIG. 14B (on which rectangles 72a each circumscribed about cut mark 72 are spaced apart from respective reference marks 73 with different distances) after a process of die cutting without performing adjustment of die-cutting position (FIG. 15A), and after a process of removing waste from the label stock (FIG. 15B). In the case that rectangles 72a are spaced apart from respective reference mark 73 with the different distances, and an operator visually checks label stock 70a after a process of removing waste, the operator can determine the label on which the displacement amount of cutting position 74 from the printing position of the corresponding rectangle 72a is the minimum in the machine direction, by finding a label on which the right and left sides of rectangle 72a remaining on the label (the part of the label stock face inside the corresponding cutting position 74) have the almost same lengths (in this case, the label on which "+4 mm" is printed, in the upper line in FIG. 15B), and can determine the label on which the displacement amount of cutting position 74 from the printing position of the corresponding rectangle 72a is the minimum in the cross-machine direction, by finding a label on which the top and bottom sides of rectangle 72a remaining on the label (the part of the label stock face inside the corresponding cutting position 74) have the almost same lengths (in this case, the label on which "+2 mm" or "+3 mm" is printed, in the lower line in FIG. 15B). From the values printed on these labels, each of which is the shift amount from the corresponding reference mark 73, the operator can recognize the current displacement amounts of die-cutting positions (in other words, the correction amounts of die-cutting positions) in the machine direction and the cross-machine direction. In a case that rectangles 72a are spaced apart from respective reference mark 73 with different distances and a pair of sides (right and left sides or top and bottom sides) of each printed rectangle 72a are hardly observed on the corresponding label (the part of the label stock face inside the corresponding cutting position 74) given after the process of removing waste, the rectangles 72a in the adjusting image may be reduced in size so that the pair of the sides of each printed rectangles 72a remaining on the corresponding labels given after the process of removing waste can be sufficiently observed.

FIG. 16 illustrates another example of the adjusting image printed on a continuous label stock in label printing according to the present embodiment. In this example, in place of cut marks 72, scales 75 each including graduations covering the area, of cut mark 72, are spaced apart from respective reference marks 73 with different distances in the adjusting image, to be printed on label stock 70. In this case, scales 75 each including graduations covering the area of cut mark 72, are spaced apart from respective reference marks 73 with different distances in the machine direction (in the horizontal direction of FIG. 16), in the adjusting image. The graduations of each of the scales 75 may be arranged at intervals of, for example, 1 millimeter. Further, each of scales 75 may be arranged together with graduation values (values from 1 mm to 4 mm in FIG. 16) and/or with the shift amount from the corresponding reference mark 73 (values from +0 mm to +0.3 mm in FIG. 16), in the adjusting image.

FIG. 17 illustrates an example of the label stock 70 of FIG. 16 (on which scales 75 each including graduations covering the area of cut mark 72 are spaced apart from respective reference marks 73 with different distances) after a process of die-cutting without performing adjustment of die-cutting position and a process of removing waste from label stock 70. In the case that the adjusting image is created by using scales 75 each including graduations covering the area of cut mark 72 and an operator visually checks label stock 70a after a process of removing waste, the operator can determine the displacement amount of actual cutting positions 74 from the respective reference marks 73 in the machine direction of label stock 70 with accuracy, by finding a label on which the top position of the label or the cut position 74 of the label, and the printing position of one of graduations in scale 75 match (a label on which a graduation appears just inside the top part of cut position 74 in the machine direction, in this case, the second label from the left in FIG. 17). By using the shift amount of this label from the corresponding reference mark 73 and the graduation values on the label, the operator can recognize the accurate displacement amount of actual cutting positions 74 from the respective reference marks 73, and thereby, can recognize the current displacement amount of die-cutting positions (in other words, the correction amount of die-cutting positions) with accuracy.

A description is given below of operations of printer controller 30 according to the present embodiment. CPU 32 reads out a label-printing control program stored in ROM 33 or storage unit 35, loads the program onto RAM 34, and executes the program, thereby performing the processing of the steps illustrated in the flowcharts of FIGS. 18 to 20.

First, built-in controller 31 (print-data analyzer 31a) of printer controller 30 receives print data including cutting data from client terminal 20, and analyzes the print data to extract an object representing a reference mark and an object representing a cut mark (for example, an object to which a spot color is specified) from images contained in the print data (Step S100).

Next, built-in controller 31 (adjusting-image creator 31c) creates an adjusting image (Step S110). FIG. 19 illustrates operations to create the adjusting image. First, built-in controller 31 (adjusting-image creator 31c) renders a reference mark, preferably in a single color of black (Step S111). Next, built-in controller 31 (adjusting-image creator 31c) renders one or more cut marks one or more specific images each created from the cut mark, such as rectangles each circumscribed about the cut mark or scales each including graduations covering the area of the cut mark), preferably in a single color of black (Step S112), and defines the coordinates of the one or more cut marks (specific images) so as to be spaced apart from the reference mark with the distance which changes (increases or decreases) at fixed intervals or at intervals changing in a stepwise manner, together with repetitions of rendering of the reference mark and one or more cut marks (specific; images) (Step S113). Built-in controller 31 (adjusting-image creator 31c) then judges whether a predetermined number of the repetitions of the rendering process have been made (Step S114), and returns to Step S111 to repeat the rendering process until a predetermined number of the repetitions have been done. The number of the repetitions may be defined by an operator arbitrarily; or may be defined by using the size of one or more label images and the shift amount of the one or more cut marks (specific images) from the corresponding reference mark to calculate the number of repetitions after which the distance of one or more cut marks (specific images) from the next reference mark is the same as the distance of one or more cut marks (specific images) from the corresponding reference mark in the first rendering. In the example of rendering cut marks, each of which is for cutting a label image being 10 mm in size, spaced apart from the respective reference marks with distances which increase by 1 millimeter along with repetitions of the rendering process, built-in controller 31 (adjusting-image creator 31c) repeats the rendering process 100 times;

Returning to the flowchart of FIG. 18, built-in controller 31 (print-instruction controller 31d) stores data of the adjusting image created in Step S110 into buffer 38 for image transfer and sends the image data to label printing device 40 through engine interface unit 37, to cause label printing device 40 to perform print processing, die cutting and removing waste (Step S120). By checking the appearance of the specific image created from the cut mark (such as the cut mark, a rectangle circumscribe about the cut mark, or a scale including graduations covering the area of the cut mark), remaining on each label given alter the process of removing waste, an operator recognizes the displacement amount of die-cutting positions and adjusts die-cutting positions on the label stock or the printing position of the end product image (particularly the printing positions of the label images) on the label stock, on the basis of the displacement amount.

Next, built-in controller 31 (end-product-image creator 31b) creates an end product image (Step S130). FIG. 20 illustrates operation to create the end product image. First, built-in controller 31 (end-product-image creator 31b) picks up an object to be rendered, from the print data, and judges whether the object is an object other than cut marks (in other words, the object is a label image or a reference mark) (Step S131). On judging that the object is an object other than cut marks, built-in controller 31 (end-product-image creator 31b) renders the object (Step S132). Built-in controller 31 (end-product-image creator 31b) further judges whether the object is the last object (Step S133), and returns to Step S131 to repeat the succeeding processes until the processes for the last object have been completed.

Returning to the flowchart of FIG. 18 again, built-in controller 31 (print-instruction controller 31d) stores data of the end product image created in Step S130 into buffer 38 for image transfer and sends the image data to label printing device 40 through engine interface unit 37, to cause label printing device 40 to perform print processing (Step S140).

In the above-described operations, the adjusting image is printed prior to the end product image so that the die-cutting positions on a printed label stock or the printing position of the end product image on the label stock can be adjusted on the basis of the displacement amount of die-cutting given by checking of the printed adjusting image on the label stock. In the case that printing system 10 employs label printing device 40 and finisher 50 as separated devices or the case that the adjustment of the printing position or the cutting positions does not made on the basis of the displacement amount, the end product image may be printed prior to the adjusting image.

In the above descriptions about creation of the adjusting image, cut marks (or rectangles each circumscribed about a cut mark or scales each including graduations covering the area of a cut mark) are spaced apart from respective reference marks with increasing distances, but those may be spaced apart from respective reference marks with decreasing distances.

In the above descriptions about creation of the adjusting image, cut marks (or rectangles each circumscribed about a cut mark or scales each including graduations covering the area of a cut mark) are spaced apart from respective reference marks with distances increasing at fixed intervals, but the distances may increase or decrease at intervals changing in a stepwise manner. For example, in creation of the adjusting image, the distance or shift amount of the cut marks from each reference mark may increase or decrease by a certain amount (for example, 1 mm) in the first several repetitions of the rendering, so that the die-cutting positions on the printed label stock or the printing position of the end-product image can be adjusted roughly. After that, the distance or shift amount may increase or decrease by a decreased amount (for example, 0.1 mm) in the succeeding repetitions of the rendering, so that the die-cutting positions on the printed label stock or the printing position of the end-product image can be adjusted finely.

The above descriptions were given of the adjustment of die-cutting positions with respect to printing positions of labels. The disclosed print control operations are applicable to another type of print processing that prints an additional image on a continuous stock on which a reference mark and an image corresponding to the reference mark have already been printed, while determining the printing position of the additional image on the basis of the printed reference mark. In this case, printing system 10 may further employ a second printing unit installed between printing unit 48b and finishing unit 48c (or finisher 50), and built-in controller 31 of printer controller 30 may control the second printing unit so as to print, on a continuous stock, the additional image spaced apart from each of reference marks that have already been printed, on the continuous stock, with changing the distance of the additional image from the corresponding reference mark (for example, with increasing the distance like 0.1 mm, 0.2 mm and 0.3 mm).

As described above, printer controller 30 is configured to perform the following operations. That is, built-in controller 31 of printer controller 30 analyzes print data including cutting data, to extract a label image, a reference mark and a cut mark from the print data; and creates an end product image and an adjusting image. The end product image includes the reference mark and the label image corresponding to the reference mark, and the adjusting image includes the reference marks and one or more specific images each created from the cut mark (each of which is a figure such as the cut mark, a rectangle circumscribed about the cut mark or a scale), corresponding to each of the reference marks. In creation of the adjusting image, the specific images are arranged to be spaced apart from the respective reference marks with different distances in the adjusting image. These operations realize easy adjustment of die-cutting positions (or easy adjustment of the printing position of the end product image), reduce the number of times of the adjustment of die-cutting positions necessary to cause a finishing unit or finisher to cut a label stock into label shapes at desired positions, and reduce a wasteful use of resources and man-hours for label printing. When the specific images, such as cut marks or scales, which are created in a spot color in many cases, are printed in a single color of black on a label stock, it reduces the consumption of toner in label printing device 40. The specific images further increase visibility of the specific images printed on a label stock, which also realizes easy adjustment of die-cutting positions (or easy adjustment of the printing position of the end product image).

The present invention should not be limited to the above-described embodiments and examples, and the constitution and control may be modified appropriately, unless such modification deviates from the intention of the present invention.

For example, in the above embodiments, the end product image is composed of one or more label images 71 and one or more reference marks 73, and the adjusting image is composed of cut marks 72 mid reference marks 73. The end product image and the adjusting image may fluffier include any other images or components.

The above embodiments showed the printing control operations to print the end product image and the adjusting image successively on a continuous label stock provided in roll form. If the printing system employs a finisher or a die-cutting machine that supports sheeted label material, the end product image and the adjusting image may be printed successively on different label sheets.

The present invention is applicable to label-printing control devices which realize easy adjustment of die-cutting positions in label printing, label-priming control programs to be executed in the label-printing control devices, non-transitory computer-readable recording media each storing the label-printing control program, and label-printing control methods to be used in a printing system including the label-printing control device.

The invention claimed is:

1. A label-printing control apparatus for controlling a label printing device configured to print label images, which are to be cut into label shapes by die-cutting, on a continuous label stock, the label-printing control apparatus comprising:
    an engine interface unit that communicably connects the label-printing control apparatus to the label printing device; and
    a hardware processor that performs operations including
        analyzing print data to extract a label image, a reference mark and a cut mark from the print data, the reference mark being a mark used for determining a die-cutting position on a continuous label stock, the cut mark representing a shape to cut the label image minted on the continuous label stock,
        creating, from the reference mark and the cut mark extracted from the print data, an adjusting image including a plurality of the reference marks and one or more specific; images each created from the cut mark, corresponding to each of the plurality of the reference marks, while arranging the specific images to be spaced apart from the respective reference marks with different distances in the adjusting image,
        outputting data of the adjusting image to the label printing device through the engine interface unit, to instruct the label printing device to print the adjusting image on a continuous label stock,
        creating, from the reference mark and the label image extracted from the print data, an end product image including the reference mark and the label image corresponding to the reference mark, and
        outputting data of the end product image to the label printing device through the engine interface unit, to instruct the label printing device to print the end product image on the continuous label stock.

2. The label-printing control apparatus of claim 1, wherein the creating an adjusting image, includes arranging the specific images to be spaced apart from the respective reference marks in a machine direction of the continuous label stock.

3. The label-printing control apparatus of claim 2, wherein the creating an adjusting image, includes adding values indicating the distances of the specific images from the respective reference marks in the machine direction, to the adjusting image.

4. The label-printing control apparatus of claim 1, wherein the creating an adjusting image, includes arranging the specific images to be spaced apart from the respective reference marks in a machine direction and a cross-machine direction of the continuous label stock.

5. The label-printing control apparatus of claim 4, wherein the creating an adjusting image, includes adding values indicating the distances of the specific images from the respective reference marks in one or both of the machine direction and the cross-machine direction, to the adjusting image.

6. The label-printing control apparatus of claim 1, wherein the creating an adjusting image, includes arranging the specific images to be spaced apart from the respective reference marks with distances which increase at fixed intervals or at intervals changing in a stepwise manner, or decrease at fixed intervals or at intervals changing in a stepwise manner.

7. The label-printing control apparatus of claim 1, wherein the specific images in the adjusting image are a plurality of the cut marks, a plurality of rectangles each circumscribed about the cut mark, or a plurality of scales each including graduations covering an area of the cut mark.

8. A non-transitory computer-readable recording medium storing a label-printing control program to be executed in a controller of a label printing device configured to print label images, which are to be cut into label shapes by die-cutting, on a continuous label stock, the program comprising instructions which, when executed by a hardware processor of the controller, cause the hardware processor to perform operations comprising:
   analyzing print data to extract a label image, a reference mark and a cut mark from the print data, the reference mark being a mark used for determining a die-cutting position on a continuous label stock, the cut mark representing a shape to cut the label image printed on the continuous label stock;
   creating, from the reference mark and the cut mark extracted from the print data, an adjusting image including a plurality of the reference marks and one or more specific images each created from the cut mark, corresponding to each of the plurality of the reference marks, while arranging the specific images to be spaced apart from the respective reference marks with different distances in the adjusting image;
   outputting data of the adjusting image to the label printing device through an engine interface unit of the controller, to instruct the label printing device to print the adjusting image on a continuous label stock;
   creating, from the reference mark and the label image extracted from the print data, an end product image including the reference mark and the label image corresponding to the reference mark; and
   outputting data of the end product image to the label printing device through the engine interface unit, to instruct the label printing device to print the end product image on the continuous label stock.

9. The non-transitory computer-readable recording medium of claim 8, wherein the creating an adjusting image, includes arranging the specific images to be spaced apart from the respective reference marks in a machine direction of the continuous label stock.

10. The non-transitory computer-readable recording medium of claim 9, wherein the creating an adjusting image, includes adding values indicating the distances of the specific images from the respective reference marks in the machine direction, to the adjusting image.

11. The non-transitory computer-readable recording medium of claim 8, wherein the creating an adjusting image, includes arranging the specific images to be spaced apart from the respective reference marks in a machine direction and a cross-machine direction of the continuous label stock.

12. The non-transitory computer-readable recording medium of claim 11, wherein the creating an adjusting image, includes adding values indicating the distances of the specific images from the respective reference marks in one or both of the machine direction and the cross-machine direction, to the adjusting image.

13. The non-transitory computer-readable recording medium of claim 8, wherein the creating an adjusting image, includes arranging the specific images to be spaced apart from the respective reference marks with distances which increase at fixed intervals or at intervals changing in a stepwise manner, or decrease at fixed intervals or at intervals changing in a stepwise manner.

14. The non-transitory computer-readable recording medium of claim 8, wherein the specific images in the adjusting image are a plurality of the cut marks, a plurality of rectangles each circumscribed about the cut mark, or a plurality of scales each including graduations covering an area of the cut mark.

15. A label-printing control method for use in a printing system including a label printing device configured to print label images, which are to be cut into label shapes by die-cutting, on a continuous label stock, the method comprising:
   analyzing, by a controller of the label printing device, print data to extract a label image, a reference mark and a cut mark from the print data, the reference mark being a mark used for determining a die-cutting position on a continuous label stock, the cut mark representing a shape to cut the label image printed on the continuous label stock;
   creating, by the controller, from the reference mark and the cut mark extracted from the print data, an adjusting image including a plurality of the reference marks and one or more specific images each created from the cut mark, corresponding to each of the plurality of the reference marks, while arranging the specific images to be spaced apart from the respective reference marks with different distances in the adjusting image;
   printing the adjusting image on a continuous label stock by the label printing device;
   creating, by the controller, from the reference mark and the label image extracted from the print data, an end product image including the reference mark and the label image corresponding to the reference mark; and
   printing the end product image on the continuous label stock by the label printing device.

16. The label-printing control method of claim 15, wherein the creating an adjusting image, includes arranging the specific images to be spaced apart from the respective reference marks in a machine direction of the continuous label stock.

17. The label-printing control method of claim 16, wherein the creating an adjusting image, includes adding values indicating the distances of the specific images from the respective reference marks in the machine direction, to the adjusting image.

18. The label-printing control method of claim 15, wherein the creating an adjusting image, includes arranging the specific images to be spaced apart from the respective reference marks in a machine direction and a cross-machine direction of the continuous label stock.

19. The label-printing control method of claim 18, wherein the creating an adjusting image, includes adding values indicating the distances of the specific images from the respective reference marks in one or both of the machine direction and the cross-machine direction, to the adjusting image.

20. The label-printing control method of claim 15, wherein the creating an adjusting image, includes arranging the specific images to be spaced apart from the respective reference marks with distances which increase at fixed intervals or at intervals changing in a stepwise manner, or decrease at fixed intervals or at intervals changing in a stepwise manner.

21. The label-printing control method of claim 15, wherein the specific images in the adjusting image are a plurality of the cut marks, a plurality of rectangles each circumscribed about the cut mark, or a plurality of scales each including graduations covering an area of the cut mark.

22. The label-printing control method of claim 15, further comprises checking the adjusting image printed on the continuous label stock given after die cutting of the continuous label stock, to obtain a displacement amount of a die-cutting position on the continuous label stock, and adjusting the die-cutting position on the continuous label stock or a printing position of the end, product image on the continuous label stock, by using the displacement amount.

23. The label-printing control method of claim 15, further comprises printing an additional image on a continuous label stock on which an image and the reference mark were printed, while determining a printing position of the additional image on a basis of the reference mark.

* * * * *